United States Patent
Mowers et al.

(10) Patent No.: US 7,032,219 B2
(45) Date of Patent: Apr. 18, 2006

(54) SYSTEM AND METHOD FOR IMPLEMENTING A PROJECT FACILITY

(75) Inventors: Anthony A. Mowers, Berkeley, CA (US); Cy H. Myers, Berkeley, CA (US); Christopher J. Schille, Santa Clara, CA (US); Mayank H. Talati, Alameda, CA (US)

(73) Assignee: Wind River Systems, Inc., Alameda, CA (US)

( * ) Notice: Subject to any disclaimer, the term of this patent is extended or adjusted under 35 U.S.C. 154(b) by 723 days.

(21) Appl. No.: 09/765,778

(22) Filed: Jan. 19, 2001

(65) Prior Publication Data

US 2002/0066075 A1    May 30, 2002

Related U.S. Application Data

(60) Provisional application No. 60/184,856, filed on Feb. 25, 2000, provisional application No. 60/215,545, filed on Jun. 30, 2000.

(51) Int. Cl.
*G06F 9/44*    (2006.01)
(52) U.S. Cl. ............... 717/172; 717/177; 709/219; 709/225; 709/240
(58) Field of Classification Search ........ 717/168–178, 717/121–123; 709/201, 203, 213, 216, 218, 709/219, 240, 320
See application file for complete search history.

(56) References Cited

U.S. PATENT DOCUMENTS

| | | | |
|---|---|---|---|
| 5,339,435 A * | 8/1994 | Lubkin et al. ............. 717/121 |
| 5,361,357 A | 11/1994 | Kionka | |
| 5,528,757 A * | 6/1996 | Yamasaki ................. 709/201 |
| 5,564,051 A | 10/1996 | Halliwell et al. | |
| 5,764,992 A | 6/1998 | Kullick et al. | |
| 5,909,581 A | 6/1999 | Park et al. | |
| 5,953,532 A * | 9/1999 | Lochbaum ................. 717/176 |
| 5,956,513 A * | 9/1999 | McLain, Jr. ............... 717/142 |
| 6,006,034 A | 12/1999 | Heath et al. | |
| 6,009,274 A * | 12/1999 | Fletcher et al. ............ 717/173 |
| 6,256,773 B1 * | 7/2001 | Bowman-Amuah ......... 717/121 |
| 6,467,088 B1 * | 10/2002 | alSafadi et al. ............ 717/173 |
| 6,757,824 B1 * | 6/2004 | England ..................... 713/156 |

FOREIGN PATENT DOCUMENTS

| | | |
|---|---|---|
| EP | 0 899 399 | 1/1999 |
| EP | 0 945 792 | 9/1999 |
| GB | 2 325 766 | 12/1998 |
| WO | 98 27487 | 6/1998 |
| WO | 99 23556 | 5/1999 |

* cited by examiner

OTHER PUBLICATIONS

PCT International Preliminary Examination Report of Appl. No. PCT/US01/05958, mailed Mar. 19, 2003.

*Primary Examiner*—Tuan Dam
*Assistant Examiner*—Chuck Kendall
(74) *Attorney, Agent, or Firm*—Fay Kaplun & Marcin, LLP

(57) ABSTRACT

A method and system are disclosed for autoscaling, i.e., determining if an application program or an operating system within a system project uses components that are not already included within the system project ("needed components"). A user of a project facility is shown these needed components and allowed to select the components that are to be added to the system project. Autoscaling may also determine the components that are not used by the application program or the operating system ("deadwood components") but still present in the system project. These deadwood components are displayed to the user and the user is allowed to remove them from the system project.

53 Claims, 21 Drawing Sheets

Component Cross-Reference Database (cxrDoc)

SYSTEM AND METHOD FOR IMPLEMENTING A PROJECT FACILITY

PRIOR PROVISIONAL PATENT APPLICATIONS

This application claims the benefit of U.S. Provisional Application No. 60/184856 filed Feb. 25, 2000, and U.S. Provisional Application No. 60/215545 filed Jun. 30, 2000.

BACKGROUND INFORMATION

Embedded devices such as is found in automobiles, medical devices, and cellular phones have limited resources compared to standard "desktop" PC-type computing environments (for example, less memory may be used and a limited set of I/O devices may be supported). Because an embedded device has limited resources, it is easier to perform software development on a cross-development host prior to implementation in the embedded device. Such development is facilitated by an integrated development environment ("IDE").

FIG. 1 shows a block diagram illustrating a typical IDE 1, such as the Tornado™ development environment from Wind River Systems, Inc., used to develop and debug software applications. The hardware used to implement the IDE 1 includes one or more hosts 10 and one or more targets 20 (e.g., embedded devices). The IDE 1 allows developers to organize, write, and compile applications on the host 10, and then download, run, and debug them on the target 20. The host 10 is typically equipped with large amounts of RAM and disk space, backup media, printers, and other peripherals. In contrast, the target 20 typically has limited resources (small amounts of RAM, no disk, no display, etc.), and perhaps some small amount of additional resources for testing and debugging. A number of alternatives exist for connecting the target 20 to the host 10, but usually the connection is either an Ethernet or serial link.

Referring to FIG. 1, the target 20 may include an application 137 which is software that performs a particular function (for example, providing the functionality required for a hand held computing device). The target 20 may also include an operating system 140 which may be used to control the allocation and usage of the target's resources. The operating system 140, such as VxWorks® from Wind River Systems, Inc., is typically "scalable", i.e., components of the operating system may be included or excluded depending on the requirements of the application 137. A component is an operating system facility that can be built into, or excluded from, a custom version of the operating system 140. For example, a network TCP/IP stack component can be used to connect to a network, but this component can be safely omitted from the operating system 140 if the application does not require network functionality. The scalable feature of the operating system is especially beneficial in embedded devices because these devices tend to vary widely, using different processors and other hardware. The operating system 140 can be tailored to satisfy the requirements of the particular hardware and functionality of the embedded device while consuming minimal system resources.

The target 20 may also include a target agent 143 which allows the target 20 to communicate with the host 10. The target agent 143 responds to requests transmitted by the host 10, for example, by returning results from such requests. These requests may include memory transactions, notification services for breakpoints and other target events, and other useful communication and debugging activities.

The host 10 includes a target server 128 used for communicating with the target 20. The target server 128 satisfies target requests by breaking each request into the necessary transactions with the target agent 143. The host 10 also includes tools 150 for, among other things, creating and debugging the application 137 that is downloaded to the target 20 and for configuring the operating system 140 with particular components. The tools 150 use the target server 128 to communicate with the target 20.

As stated earlier, the operating system 140 has numerous components that can be tuned, and included or excluded, depending on the requirements of the application 137. For example, various networking and file system components may be required for one application and not another, and the tools 150 provide a means for either including them in, or excluding them from the operating system 140. However, the tools 150 may be cumbersome in that the application has to be examined by a user of the IDE 1 in order to determine the components that the application needs, or does not need; and thereafter, those needed components have to be manually added and the unneeded components have to be manually removed from the operating system 140.

The operating system 140 may implement objects that prevent interference by malfunctioning and/or malicious tasks (an object that performs an action) while maintaining high execution speeds and scalability. An example of such an object is a protection domain which is described in greater detail below. The tools 150 of the IDE 1 should support these objects.

The tools 150 on the host 10 have the following inadequacies:

(1) the tools 150 require manually finding the components which the application 137 needs and then manually adding those components to the operating system 140;

(2) the tools 150 do not provide information about components that are not required and thus can be safely removed from the operating system 140; and (3) the tools 150 should support new operating system objects.

SUMMARY OF THE INVENTION

According to an exemplary embodiment of the present invention, a method is described that includes (1) determining a set of present components assigned to a domain, each of the set of present components includes a set of modules; (2) determining a set of symbols imported by the set of modules assigned to the domain; (3) determining zero or 110 more needed components to which the domain does not have access and also provides the set of symbols imported by the set of modules or is also specified as required by the set of present components; and (4) adding the zero or more needed components into the domain.

A system is also described according to an exemplary embodiment of the present invention that includes a first parser that lists a set of symbols and a set of modules that imports or exports the set of symbols, a second parser that maps the set of modules to a set of components and specifies dependencies among the set of components, and a project analysis utility that (1) determines a set of present components assigned to a domain, each of the set of present components includes a subset of the set of modules; (2) determines a subset of the set of symbols imported by the subset of modules assigned to the domain; (3) determines zero or more needed components to which the domain does not have access, and also provides the subset of symbols imported by the subset of modules or is also specified in the mapping by the second parser as required by the set of present components; and (4) adds the zero or more needed components into the domain.

A method is also described according to an exemplary embodiment of the present invention that includes (1) determining a set of present components assigned to a domain; (2) determining zero or more precious components specified by a user of a project facility as not removable from the domain, each of the zero or more precious components includes a set of modules; (3) determining a set of symbols imported by the set of modules in each of the zero or more precious components; (4) determining zero or more needed components to which the domain does not have access and also provides the set of symbols imported by the set of modules, or is also specified as required by the zero or more precious components; (5) if one or more of the zero or more needed components is found in the set of present components, then moving the one or more of the set of present components into the zero or more precious components; and (6) removing the set of present components from the domain.

A system is also described according to an exemplary embodiment of the present invention that includes a first parser that lists a set of symbols and a set of modules that imports or exports the set of symbols; a second parser that maps the set of modules to a set of components and specifies dependencies among the set of components; and a project analysis utility that (1) determines a set of present components assigned to a domain; (2) determines zero or more precious components specified by a user of a project facility as not removable from the domain, each of the zero or more precious components includes a subset of the set of modules; (3) determines a subset of the set of symbols imported by the subset of modules; (4) determines zero or more needed components to which the domain does not have access and also provides the subset of symbols imported by the subset of modules, or is also specified as required by the zero or more precious components; (5) if one or more of the zero or more needed components is found in the set of present components, then moves the one or more of the set of present components into the zero or more precious components; and (6) removes the set of present components from the domain.

DETAILED DESCRIPTION

A first exemplary embodiment of an IDE according to the present invention includes a project facility (a tool residing on the host) that automatically determines, for example, if an application program or an operating system requires components that are not included in the system project and allows a user of the project facility to add the required components to the operating system 140.

Figure 1:
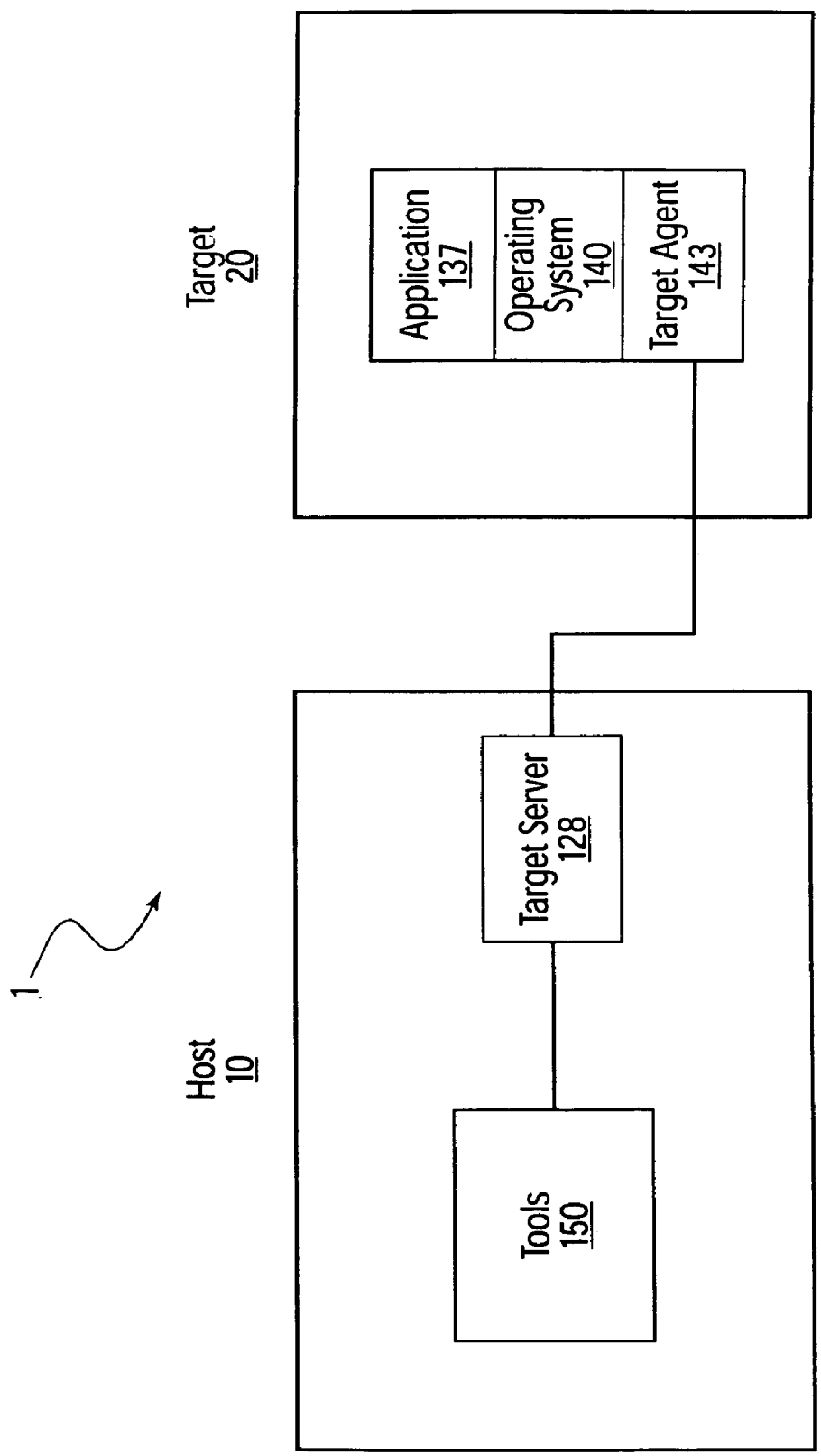
FIG. 1 shows a block diagram illustrating an integrated development environment.
Figure 2:
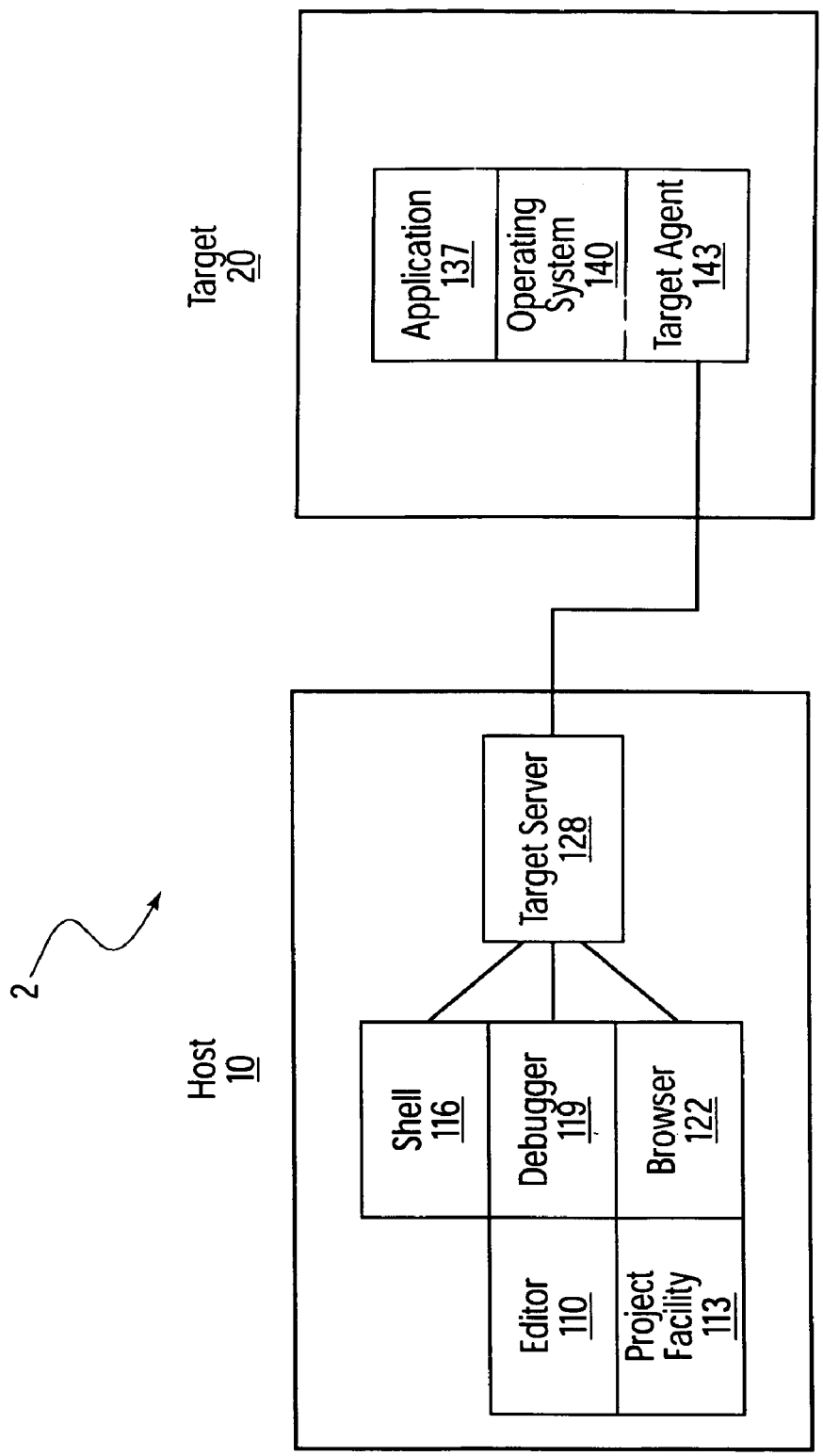
FIG. 2 shows a block diagram illustrating an integrated development environment of a first exemplary embodiment according to the present invention.

FIG. 2 shows a block diagram illustrating the first exemplary IDE 2. In FIG. 2, the host 10 may include a number of tools such as an editor 110 used to edit the source-code in which the application 137 is written. The host 10 may also include a project facility 113 that provides graphical and automated mechanisms for, among other things, creating applications that can be downloaded to the target 20, and for configuring the operating system 140 with selected components. For example, various networking and file system components may be required for one application and not another, and the project facility 113 provides a simple means for either including them, or excluding them from the operating system 140.

The host 10 may also include a shell 116 that acts as a command interpreter that provides access to operating system routines and dispatches requests to the target server 128 for any action involving target-resident programs or data. The host 10 may also include a debugger 119 which is used to debug an application program by, for example, setting breakpoints in the application 137 or controlling its execution. The host 10 may also include a browser 122 which is used to monitor the state of the target 20. The browser 122 provides detailed information about objects (e.g., tasks, semaphores, message queues, etc.) running on the target 20.

The exemplary project facility 113 according to the present invention provides mechanisms for:
  organizing the files that make up a project;
  grouping related projects into a workspace;
  customizing and scaling the operating system 140;
  adding application initialization routines to the operating system 140;
  defining varied sets of build options; and
  downloading application objects to the target.

The project includes source code files, build settings, and binaries that are used to create a downloadable application program, or a custom version of the operating system 140 (called a bootable application). The downloadable application includes one or more relocateable object modules, which can be downloaded and dynamically linked to the operating system 140, and then started from the shell 116 or the debugger 119. Dynamically linked means that object modules can be loaded onto a running system. The object module ("module") is source code (source code is program code that is written in a high-level or assembly language that is not directly readable by a computer) that has been compiled using a compiler. The module is an intermediate form in the process of compiling application code from higher level language into machine executable code. The bootable application includes an application linked to a custom version of the operating system 140. A project may be either a bootable project or a downloadable project.

A "scalable" operating system is statically partitioned into units of functionality that (1) expose an interface(s) to the underlying hardware and (2) expose the interface(s) to units of software that extend the operating system. These units of extensibility are called project facility software components ("components"). Components are an operating system facility that can be built into, or excluded from, a custom version of the operating system 140. The component may include, among others, the following items: modules; a list of symbols causing the modules to be linked into the project; a description of constraints; parameters; and parameter values.

For a component to run properly, that particular component may have initialization code that needs to be executed. If a component does require that initialization code be executed, then that code must be executed in a certain order. For example, to access a network, an FTP server component may be started only after a network stack component is started.

Figure 3:
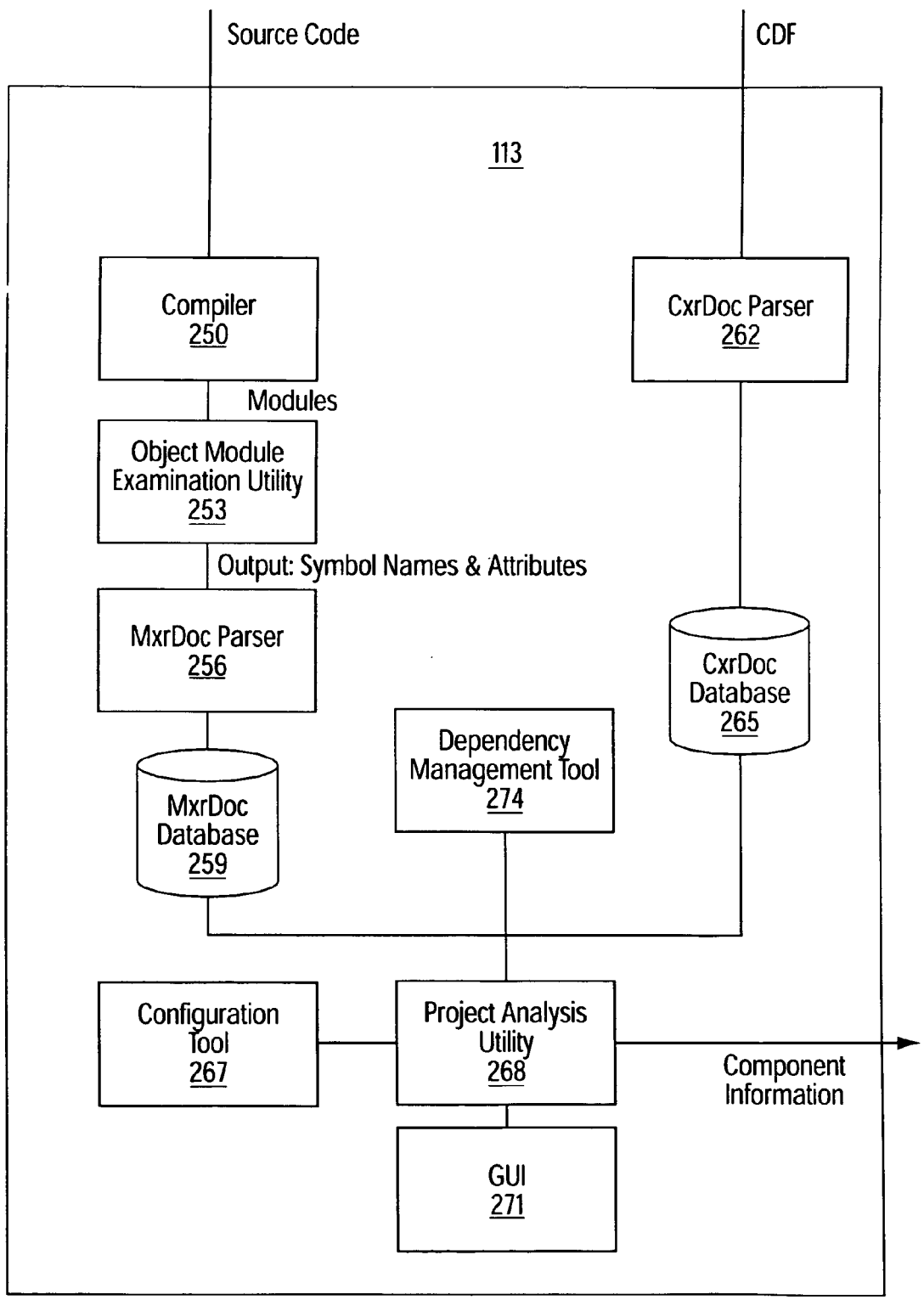
FIG. 3 shows a block diagram of a project facility of the first exemplary embodiment according to the present invention.

FIG. 3 shows a block diagram of the exemplary project facility 113 according to the present invention. The project facility 113 includes a compiler 250 which compiles the application source code into modules. The output from the compiler 250 is sent to an object module examination utility 253 which reads the modules and identifies all symbols either exported (i.e., produced) or imported (i.e., used) by the modules. The outputs of the object module examination utility 253 are symbol names and attributes (such as whether a particular symbol is imported or exported). These outputs are sent to a module cross-reference document ("mxrDoc") parser 256 which, using the outputs, populates a first database designated a mxrDoc database 259. The mxrDoc database 259 is a database containing one or more symbols and modules. The mxrDoc database 259 allows for determining whether a specific module exports or imports a specific symbol.

Referring to FIG. 3, a component cross-reference document ("cxrDoc") parser 262 is also included in exemplary project facility 113, and takes as an input a component description file ("CDF"). The CDF is a database that describes for a given computing environment all the components that could be in the bootable project. The output of the cxrDoc parser 262 is used to populate a second database designated a cxrDoc database 265. The cxrDoc database 265 is a gallery of components and modules that can possibly be used in a bootable project. The cxrDoc database 265 maps modules to components and also indicates the components that a particular component requires.

In addition to modules and components, the cxrDoc database 265 may also include the following objects: (1) parameters (initial values), (2) InitGroup (determines relative order of when components get initialized); (3) folders (groups components for display purposes; also allows user to add multiple components simultaneously); (4) selection (ensures that a particular interface is satisfied, e.g., only one network driver is selected for the TCP/IP stack); and (5) symbols.

A project analysis utility 268 may be coupled to the mxrDoc database 259 and the cxrDoc database 265 and is used to analyze the information in the mxrDoc database 259 and the cxrDoc database 265 in order to, for example, determine the set of operating system components which are needed by a particular application program. The project analysis utility 268 outputs component information, such as the components included in the application program that is to be downloaded to the operating system 140. A configuration tool 267 is coupled to the project analysis utility 268. The configuration tool 267 is used to build a bootable project. The bootable project includes the source code files, build settings, and binaries that are used to create the downloadable application or the bootable application. A GUI 271 is coupled to the project analysis utility 268 and may allow the user of the project facility to, for example, view a set of components needed by the application program.

A dependency management tool 274, using the mxrDoc database 259 and the cxrDoc database 265, determines component dependencies each time a component is included or excluded. That is, it determines if a component which is to be included is dependent upon other components that have not been included in the bootable project, or if a component that is to be deleted is required by other components. When a component is included, any dependent components are automatically included. When a component is excluded, any dependent components are also excluded.

In this first exemplary embodiment, an autoscale feature of the project facility 113 determines if the application source code requires any components that are not included in the bootable project, and adds them as instructed by the user of the project facility. It also provides information about components that are not required by the application program and thus can be removed.

In the first exemplary embodiment, the autoscale feature has two phases: (1) the "scale up" phase which entails enumeration and inclusion of the components needed by the application program; and (2) the "deadwood removal" phase which indicates the components that may not be needed by the application program.

Figure 4:
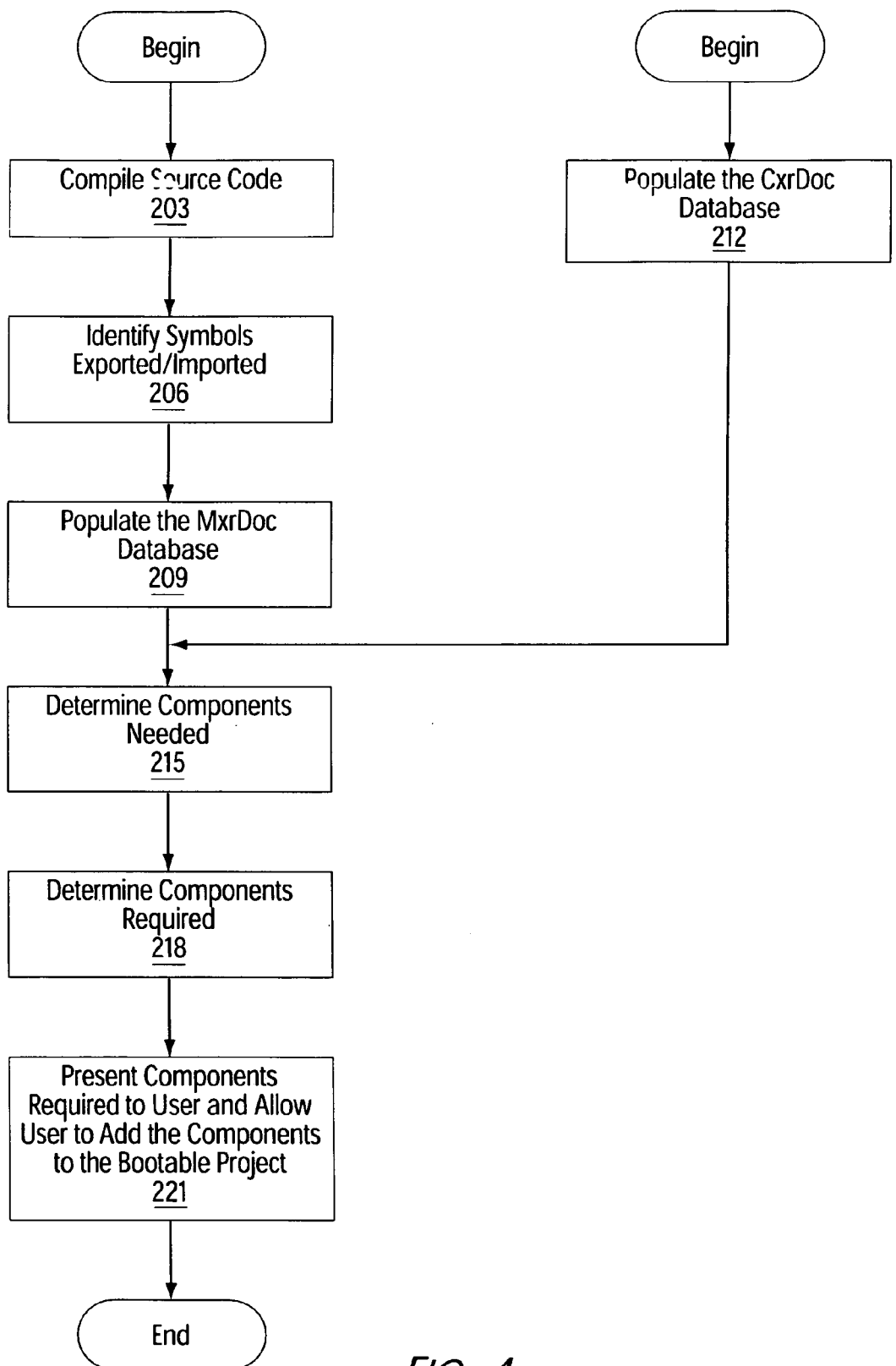
FIG. 4 shows a flowchart for steps involved in a scale up phase of auto scaling in the first exemplary embodiment according to the present invention.

FIG. 4 shows a flowchart for an exemplary set of steps involved in the scale up phase of autoscaling according to the first exemplary IDE embodiment. In step 203, the application source code, which may be written in a programming language such as "C", is compiled. As stated earlier, the compiled source code may be referred to as one or more "modules". In step 206, the modules are fed to an object module examination utility 253 which reads each module and identifies any symbols in the module as either exported or imported by the module.

In step 209, the mxrDoc database 259 is populated by streaming the output of the object module examination utility 253 to the mxrDoc parser 256 which uses the output streamed to populate the mxrDoc database 259. The output streamed from the object module examination utility 253 is, for example, symbol names and attributes (such as whether a particular symbol is imported or exported). The mxrDoc parser 256 formats the output streamed into graphs within the mxrDoc database 259 which, for example, may be used to find symbols that are imported or exported by a particular module.

Figure 5:
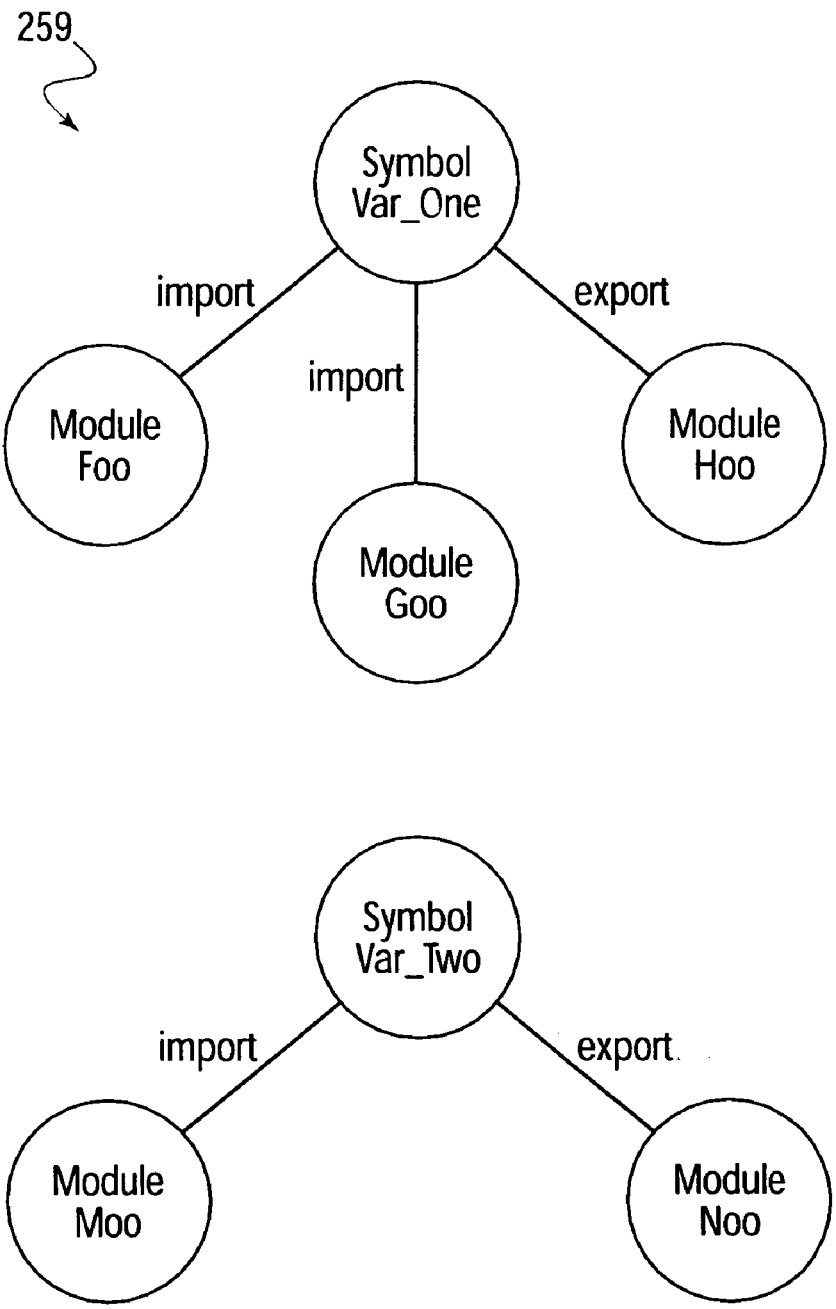
FIG. 5 shows a diagram illustrating an example of a module cross-reference database.

FIG. 5 shows a diagram illustrating an example of the mxrDoc database 259. The mxrDoc database 259 is a database containing one or more symbols and modules. A symbol is a name that represents a memory location of a code or data structure. The symbol may be: (1) produced (exported) and thus made available to others; (2) private to other modules; or (3) unresolved and thus must come from elsewhere (imported).

The symbol may have a name such as "var_one", which may be associated with a value representing a memory location. Modules may also be named. For example, a particular module may have the name "foo" and thus can be referenced by, for example, other modules by using the name "foo".

Referring to FIG. 5, in the exemplary mxrDoc database 259, a symbol "var_one" is imported (i.e., used) by a module foo; the symbol var_one is also imported by a module "goo"; and the symbol "var_one" is exported (i.e., produced) by a module "hoo". In addition, a symbol "var_two" is exported by a module "noo", and imported by a module "moo".

The mxrDoc database 259 maps symbols to modules. The mxrDoc database 259 allows for determining whether a specific module exports or imports a specific symbol. For example, in FIG. 5, to find all modules that import the symbol var_one, the edges of a graph in the mxrDoc database 259 are traversed to find that the module "foo" and the module "goo" import the symbol "var_one".

Referring to FIG. 4, in step 212, the cxrDoc database 265 is populated by streaming the CDF to the cxrDoc parser 262 which formats the CDF into graphs within the cxrDoc database 265 that may be used, for example, to find modules mapped to a particular component. The mxrDoc database 259 and the cxrDoc database 265 are populated independently of each other.

Figure 6:
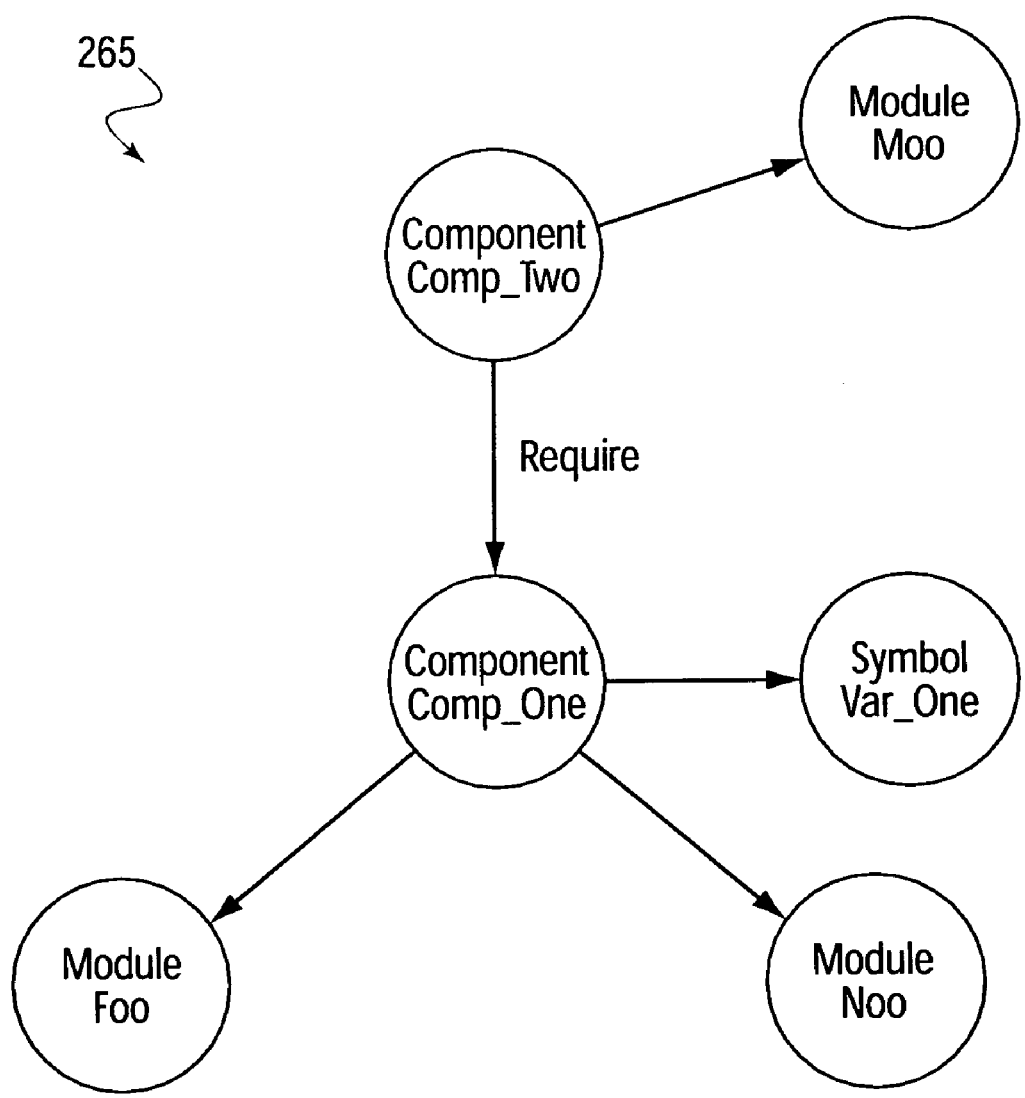
FIG. 6 shows a diagram illustrating an example of a component cross-reference database.

FIG. 6 shows a diagram illustrating an example of the cxrDoc database 265. As mentioned earlier, the cxrDoc database 265 is a gallery of possible components and modules that may be present in a project. The cxrDoc database 265 maps, for example, modules to components. In FIG. 6, module foo and module noo are mapped to a component "comp_one". The cxrDoc database 265 also indicates which components are required by other components. In FIG. 6, component comp one requires a component "comp_two" and therefore component comp one is dependent on component comp_two.

Referring to FIG. 4, in step 215, the project analysis utility 268 determines the operating system components needed (the "needed set") by the application program. In order to determine the needed set, a query is run against the mxrDoc database 259 and the cxrDoc database 265 to determine those symbols that are imported by the application modules and exported by the operating system components. The needed set includes those components exporting symbols which are not exported by the components currently available in a particular bootable project. The needed set may also include components which are specified as being required when a certain condition is satisfied (e.g., the "include when" command in the CDF may be used to suggest that component "C4" be included in the bootable project whenever component "C1" and component "C2" are present). The particular bootable project is dependent on the needed set, and the set of components in the needed set will be linked to the particular bootable project at the time the particular bootable project is built. In step 218, the project analysis utility 268 determines the set of operating system components which are required (the "required set") by the particular bootable project. The required set is found by subtracting the set of components presently in the bootable project (the "present set") from the needed set.

As an example of using the mxrDoc database 259 and the cxrDoc database 265 to determine the present set, the needed set, and the required set, referring to FIG. 5, assume that module noo is located in component comp_one and that component comp_one resides in a bootable project "boot_proj_one". Also, assume that module moo is located in component comp_two and component comp_two resides in a bootable project "boot_proj_two". Running the exemplary autoscale function for boot_proj_one and in particular comp_one, the mxrDoc database 259 (in FIG. 5) shows that module noo exports the symbol var_two and that module moo imports the symbol var_two. Therefore, module moo is dependent on module noo. The cxrDoc database 265 (in FIG. 6) shows that module moo resides in comp_two and that module noo resides in comp_one. Running the exemplary autoscale function for boot_proj_one finds that the present set includes comp_one. The needed set for boot_proj_one includes comp_one and comp_two (i.e., module noo in comp_one depends on module moo in comp_two). The required set is the present set subtracted from the needed set. Thus, the required set includes comp_two. Because comp_two is required to define var_two, comp_two should be included in boot_proj_one (i.e., comp_two will be linked to boot_proj_one at the time of its build).

Figure 7:
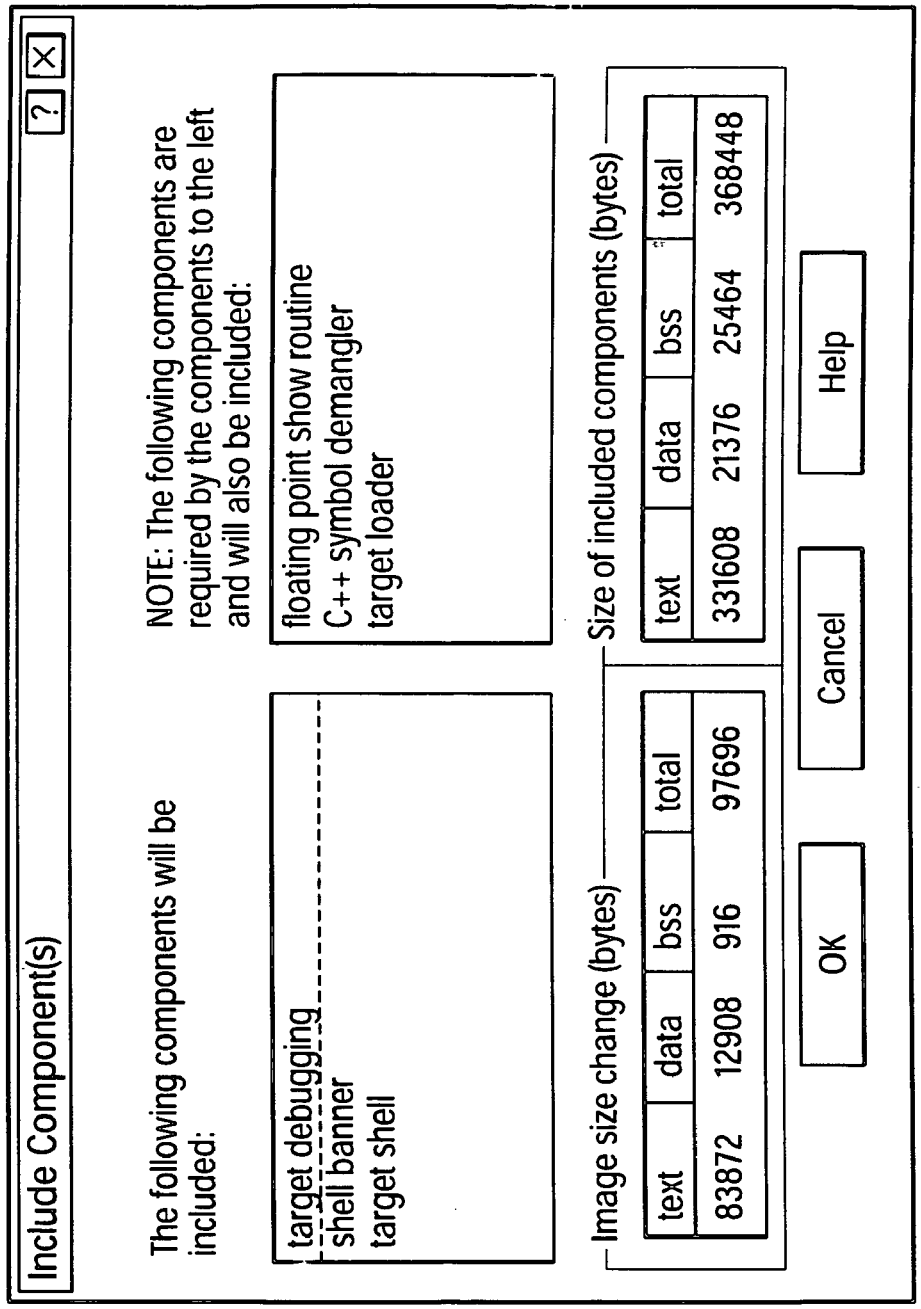
FIG. 7 shows a graphical user interface ("GUI") allowing a user to add components in a required set in the first exemplary embodiment according to the present invention.

Referring to FIG. 4, in step 221, the project analysis utility 268 presents the components in the required set to the user of the project facility via the GUI 271. The user has the option to add the components in the required set to the bootable project. FIG. 7 shows a first display example from graphical user interface 271 that allows the user to add the components in the required set. In FIG. 7, the components in the left box indicate the components that the user wishes to add to the bootable project. The components in the right box are the components which are required by the components in the left box. By selecting the "OK" button, the components in the right box will be added to the bootable project.

In the first exemplary embodiment, the deadwood removal phase of autoscaling may be implemented by subtracting the needed set from the present set to suggest components that are not needed and thus at the user's option, those unneeded components can be removed from the bootable project.

In a second exemplary embodiment of the project facility according to the present invention, the project facility supports the use of "protection domains" by the operating system 140. A protection domain system segregates a computing environment into a number of "protection domains." Each protection domain is a "container" for system resources, executable code and data structures, as well as for executing tasks and system objects (such as semaphores and message queues). Each resource and object in the system is "owned" by exactly one protection domain. The protection domain itself is a self-contained entity, and may be isolated from other system resources and objects to prevent tasks executing in the protection domain from potentially interfering with resources and objects owned by other protection domains (and vice versa).

In this exemplary embodiment, the project facility supports three basic types of projects: systems, domains, and components. System projects contain collections of domains; domains contain collections of components; and components contain source files and modules. The domains of the project facility represent the protection domains implemented by the operating system on the target. Thus the project facility, by using domains within system projects, supports the use of protection domains by the operating system 140 running on the target 20.

The protection domain system also provides mechanisms by which tasks executing in one protection domain may access resources and objects contained in a separate protection domain. These mechanisms called entry points allow a particular domain to specify that other domains may access the components, modules, functions, and symbols residing in the particular domain.

The second exemplary embodiment of the project facility includes an autoscale feature. The autoscale feature is implemented in two phases: (1) a "scale-up" phase to ensure that needed components are available in the system, allowing the user the option to add those needed components; and (2) a "deadwood removal" phase that gives the user the option to remove unneeded components from the respective domains. The autoscale feature thus identifies the minimum set of components needed for the system project to execute properly.

In this embodiment, a component is a discrete unit of functionality. It may be an entire application program or operating system or one of several pieces. Components include, among others, modules and source files (source files contain source code). In this embodiment, the entire system project is effectively "componentized", i.e., the system project is effectively composed entirely of components. When new source code is added to the system project, the autoscale feature componentizes the new source code (i.e., the source code is included in a component) and information associated with the new source code (e.g., modules and symbols associated with the source code) is added to the mxrDoc database and the cxrDoc database. Because the new source code is componentized and information about the new source code is inserted into the cxrDoc database, the dependency management tool (for example, dependency management tool 274 shown in FIG. 3) is merged into the autoscale feature (i.e., the project analysis utility includes the functionality of the dependency management tool).

In the second exemplary embodiment, taking advantage of the fact that everything in the system is componentized (including new user source code), the CDF may include dependencies between components which may otherwise be missed (e.g., the dependencies of the pointer may be missed because the pointer references a memory address rather than a symbol). Componentizing new user source code allows the autoscale feature to find an accurate list of dependencies. However, even though everything in the system project is componentized, some component dependencies may not appear when using ordinary symbolic analysis (e.g., the dependencies of the pointer will not be found). In order to compensate for the dependencies that may be missed, a statement such as "REQUIRES" may be used in the CDF to specify that when one component is present, then another component is also required (e.g., C1 REQUIRES C9 specifies that if component C1 is present in a domain, then component C9 must also be present in that domain).

In this exemplary embodiment, because it cannot be known a priori what other components will be available in other domains in a given system when a domain is created, autoscale operates in the context of a system project (i.e., a system project is autoscaled rather than only a domain). A kernel domain, however, may be autoscaled by itself.

In the second exemplary embodiment, the cxrDoc database may also include, among others, the following objects: (1) domains (a static description of a protection domain); (2) a symbol exported by this component, available for linkage to a component in another domain ("EntryPoint"); (3) an object describing a region of memory ("PhysRegion"); and (4) an object managing the regions of memory available on the target 20 ("PhysRegionTable").

Figure 8:
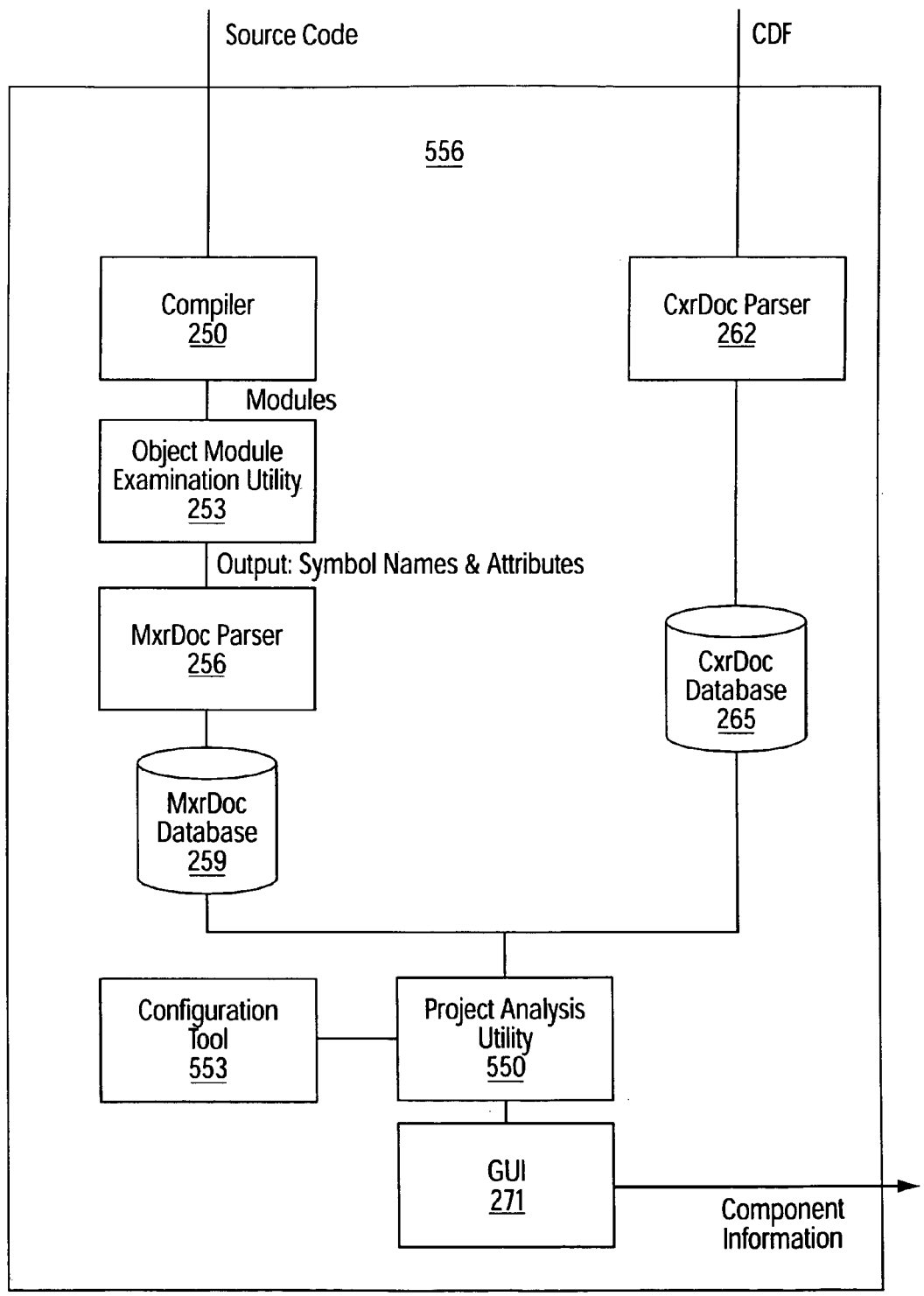
FIG. 8 shows a block diagram of a project facility of a second exemplary embodiment according to the present invention.

FIG. 8 shows a block diagram of the exemplary project facility 556 according to the second exemplary embodiment. In FIG. 8, a configuration tool 553 may be used to configure the set of domains in a system, to populate the domains with components, specify components that are precious (defined below), specify that a component may not reside in a particular domain, and specify entry points for a particular domain.

A project analysis utility 550 may be used to analyze the information in the mxrDoc database 259 and the cxrDoc database 265 in order to, for example, determine the set of operating system components and application components which are needed by each of the multiple domains of a particular system. The project analysis utility 550 also performs those tasks that were delegated to the dependency management tool 274 of the first embodiment (see FIG. 3; the tasks include the task of finding component dependencies each time a component is included or excluded), and thus the dependency management tool 274 has been merged into the project analysis utility 550. The project analysis utility 550 may also find the set of needed components by performing two-passes. For each domain, a first pass finds a set of needed components and a set of components that are needed but cannot reside in the particular domain that needs it (whether a particular component can reside in a particular domain is specified by a user of the configuration tool 553, e.g., the user may be the particular component's creator). A second pass puts each of the set of components that are needed but cannot reside in the particular domain that needs it into a domain (along the particular domain's domain link path) that can accept the component. The project analysis utility 550 may also perform deadwood removal in order to remove unneeded ("deadwood") components from their respective domains.

Figure 9:
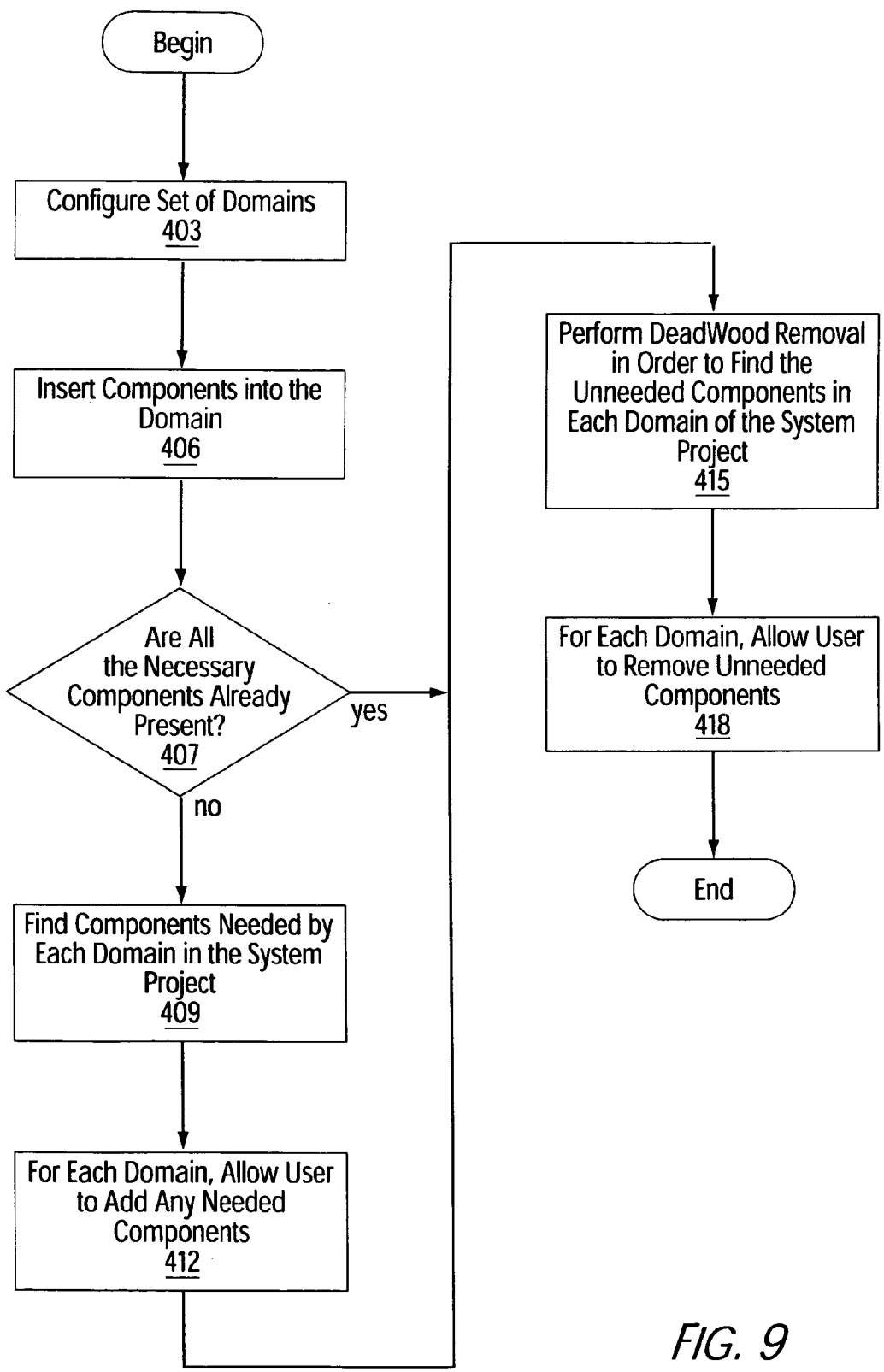
FIG. 9 shows a flowchart illustrating autoscaling steps used in the second exemplary embodiment according to the present invention.
Figure 10:
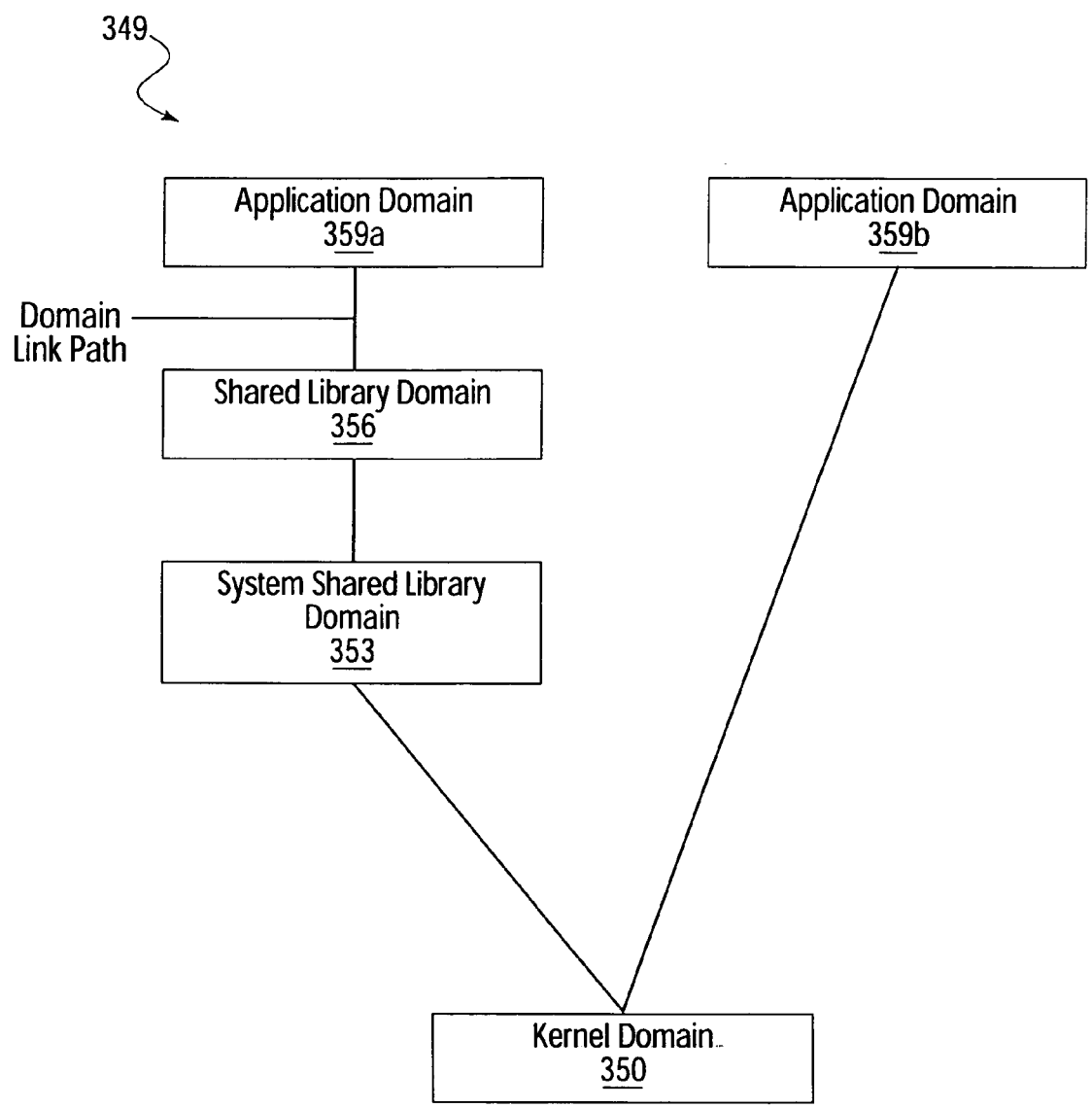
FIG. 10 shows an exemplary system project of the second exemplary embodiment according to the present invention.

FIG. 9 shows a flowchart illustrating exemplary steps of the autoscale feature according to the second exemplary embodiment. In step 403, the set of domains of a system project are created and configured by the user of the project facility. FIG. 10 shows an example of a system project 349 for purposes of illustrating this second exemplary embodiment. The system project 349 includes a kernel domain 350 that may contain all the kernel functions and data elements, and may be used to provide the memory for all system objects (e.g., semaphores and message queues). The system project 349 may also include zero or more system shared library domains 353 which are domains that include operating system components that require more access than the kernel domain's protection view allows. The system project 349 may also include zero or more shared library domains 356 which are domains that export functions or data for use by other domains. The system project 349 may also include zero or more application domains (as shown, two application domains 359a and 359b are used in exemplary system project 349) which are domains that may contain applications and the domains may reference the modules, system objects such as semaphores, and memory required by these specific applications. The application domains include components and these components reference the modules.

In step 403, the access privileges for each of the domains are also specified, i.e., the other domains to which a particular domain has access. The path created by one domain being able to access another domain at lower hierarchical levels results in a domain link path or an inter-domain link path. The domain link path or inter-domain link path is an ordered list of domains against which otherwise unresolved external symbol references (imports) are resolved by the linker. In other words, the linker matches these imports against exported symbols in the domains listed in the path. An example of a domain link path is shown in FIG. 10.

In step 406, components are inserted into the domains. In this step, the user, invoking the configuration tool 553, may insert the desired components into a particular domain. Here, the configuration tool 553 may be used to specify the entry points (which allow other domains to access these symbols) for each of the domains in the system project.

Step 403 and step 406 are configuration steps and are performed by the configuration tool 553. In the second exemplary embodiment, the configuration tool 553 may be used to create/configure systems, domains, and components. In the first exemplary embodiment, however, the configuration tool 333 did not have to create/configure multiple domains because there was effectively only one domain and only two projects available—the bootable project and the downloadable project.

Referring again to FIG. 9, in step 407, the project analysis utility 550 determines if all the necessary components are already present in each of the domains of the system project (i.e., the user of a project facility 556 included all the needed components). If all the needed components are already present, then in step 415, the deadwood removal can be performed. If all the needed components are not present, then in step 409, the needed components by each domain are found (i.e., performing the scale-up phase). The scale-up phase and the deadwood removal are independent of each other, i.e., one can be performed without performing the other.

Step 409 is the scale-up phase of autoscaling. The scale-up phase includes the following two passes: (1) for each domain, the first pass finds zero or more needed components and zero or more components that is needed but cannot reside in the particular domain that needs it; and (2) the second pass puts each of the set of components that is needed but cannot reside in the particular domain that needs it into a domain (along its domain link path) that can accept the component, and also finds the components needed, if any, by the zero or more moved components in the domain that accepted those components.

Figure 11:
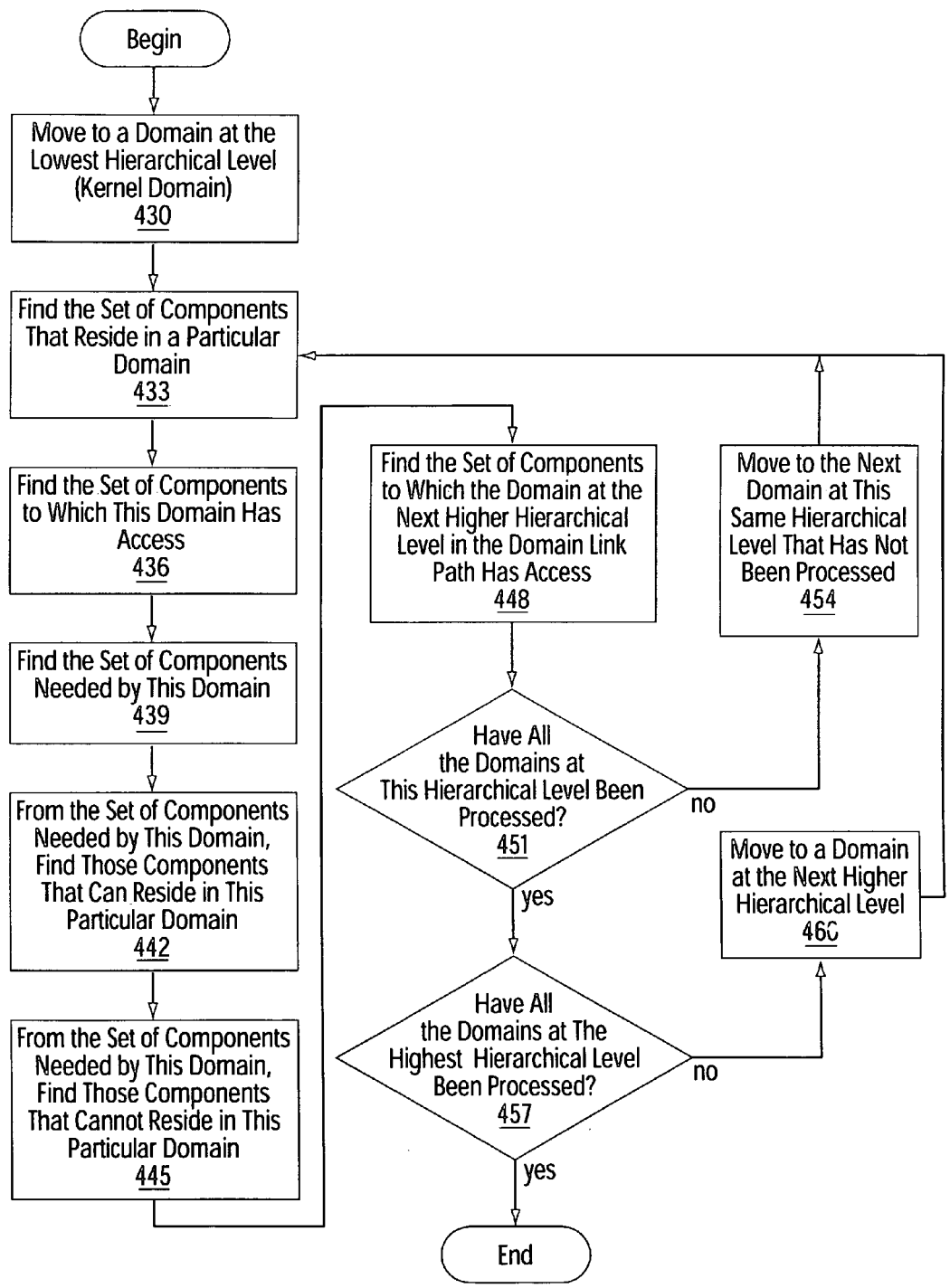
FIG. 11 shows a flowchart illustrating first pass scale-up steps used in the second exemplary embodiment according to the present invention.

FIG. 11 shows a flowchart illustrating first pass scale-up steps used in the second exemplary embodiment according to the present invention. In step 430, the first pass of the scale-up phase begins with a domain at the lowest hierarchical level (i.e., the kernel domain). In step 433, a set of components residing in the particular domain is found and this set is stored in a list. In step 436, a set of components to which the particular domain has access is found and this set is stored in another list. This set may include components that reside in a domain at a lower hierarchical level in the domain link path of the particular domain.

In step 439, the set of components needed by the components residing in the particular domain is found and this set is stored in a list. The needed components may be found using the mxrDoc database 259, the cxrDoc database 265, and entry points. From the set of components needed by the particular domain, in step 442, those components that can reside in this particular domain are found and stored in a separate list. The user of the configuration tool 553 may specify the domains in which the particular component can reside. In step 445, from the set of components needed by the particular domain, those components that cannot reside in the particular domain are found and stored in a list.

In step 448, the set of components that the domain at the next higher hierarchical level along the domain link path of the particular domain has access is found and stored in a list. This set includes the set of components to which the particular domain has access (as found in step 436), and the set of components needed by the components residing in the particular domain (as found in step 439).

In step 451, the project analysis utility 550 determines if all the domains at the hierarchical level of the particular domain have been processed. If all the domains have not been processed, then in step 454, the next domain, at the same hierarchical level as the particular domain, that has not been processed is selected and analyzed by proceeding to step 433. In step 451, if all the domains at the hierarchical level of the particular domain have been processed, then in step 457, the project analysis utility 550 determines if all the domains at the highest hierarchical level (i.e., the application domains) have been processed. If all the domains at the highest hierarchical level have not been processed, then in step 460, the project analysis utility 550 selects a domain at the next higher hierarchical level for analysis. The analysis is started by proceeding to step 433. In step 457, if all the domains at the highest hierarchical level have been processed, then the first pass of the scale-up phase is completed.

Figure 12:
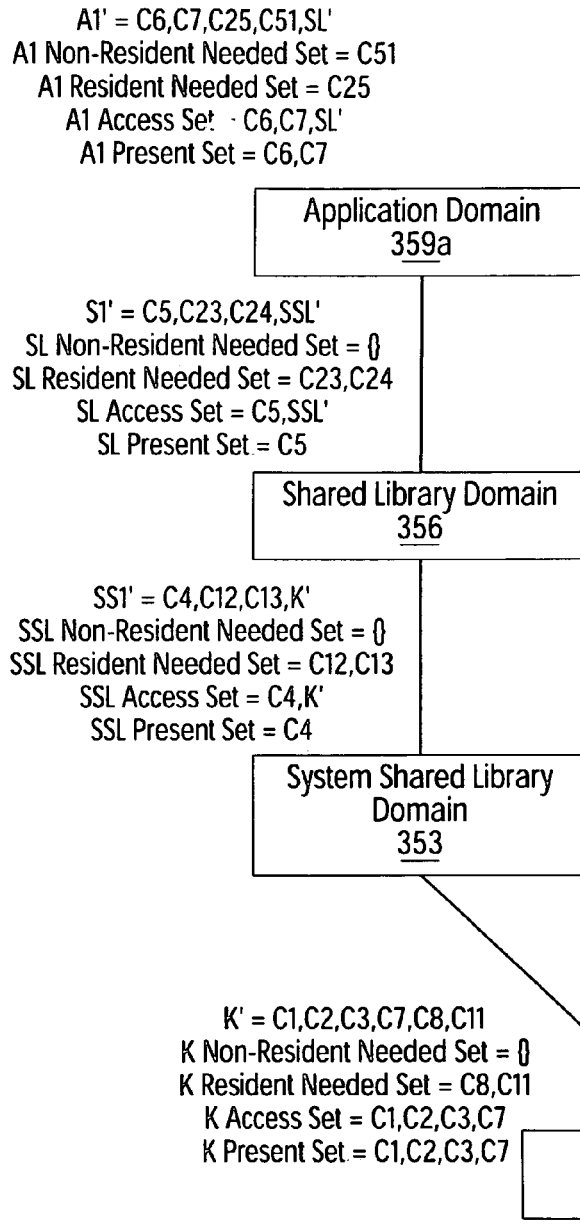
FIG. 12 shows an example of the application of the second exemplary embodiment according to the present invention to find, for each domain, a set of needed components that can reside in the particular domain that needs it and a set of components that is needed but cannot reside in the particular domain that needs it.

FIG. 12 shows an example of the application of the second exemplary embodiment according to the present invention to find, for each domain, a set of needed components and a set of components that is needed but cannot reside in the particular domain that needs it. The first-pass begins at the lowest hierarchical level (the kernel domain 350) and progresses up to the highest hierarchical level (the application domains 359a and 359b). For each of the domains, a temporary list is maintained that may be designated the "present set" and which includes the components residing in a particular domain. With regards to the kernel domain 350, the "K present set" includes the following components: C1, C2, C3, and C7. Another temporary list is maintained that may be designated the "access set" that contains the components to which the particular domain has access. With regards to the kernel domain 350, the "K access set" includes the following components: C1, C2, C3, and C7.

Another temporary list is maintained that may be designated the "resident needed set" that contains the components needed by the components in the particular domain (i.e., the resident needed set is the components needed by the components in the present set). The resident needed set contains only those components that can reside in the particular domain. As stated earlier, the user of the configuration tool 553 may specify whether a particular component can reside in a particular domain.

In the second exemplary embodiment, the component dependencies are found using the mxrDoc database 259 and the cxrDoc database 265 (refer to the first exemplary embodiment as discussed above with reference to FIG. 5 and FIG. 6). If a first component residing in a first domain is found to need a second component residing in a second domain, then the project analysis utility 550 determines if the first domain has access to the second component in the second domain, i.e., the project analysis utility 550 determines if the second domain provides an entry point to the second component (i.e., is the second component in the access set of the first domain). If an entry point is not provided, then the second component is added to the needed set of the first domain. In addition, the REQUIRES statement in the CDF file may also contribute to the needed set. If a first component is specified to require a second component using the REQUIRES statement, then the second component (and any other components that the first component needs) is added to the needed set if the second component is not in the access set of the first domain.

Referring to FIG. 12, a "K resident needed set" includes C8 and C11 (i.e., analysis of the mxrDoc database 259, the cxrDoc database 265, and entry points, indicate that components C1, C2, C3, and C7 need components C8 and C1; here, it is assumed that C8 and C11 can reside in the kernel domain).

Another temporary list is maintained that may be designated the "non-resident needed set" that contains the components needed by the present set but which cannot reside in the domain of the present set. As stated earlier, the user of the configuration tool 553 may specify whether a particular component can reside in a particular domain. Referring to FIG. 11, a "K non-resident needed set" is the empty set since the only two needed components of the present set (C8 and C11) are assumed to be able to reside in the kernel domain.

Another temporary list is maintained that may be designated the "prime (') set" which contains the components in the access set, the resident needed set, and the non-resident needed set. The prime (') set assumes that the components in the resident needed set and the non-resident needed set are added to the domain. Referring to FIG. 12, K' contains C1, C2, C3, C7, C8, and C11. K' thus represents a complete list of all the components required at this layer (the lowest hierarchical level).

Moving up the hierarchy to the system shared library domain 353, the present set for the system shared library domain 353, denoted "SSL present set", contains the following component: C4. The "SSL access set" contains the following components: C4 and K'. K' is in the access set for the system shared library 353 because the components present (and needed) by the kernel domain 350 are assumed to have been added to that domain for purposes of the determination, and the system shared library domain 353 is effectively considered to have access to all those components (the components in the kernel's resident needed set, non-resident needed set, and present set). The "SSL resident needed set" (the method for finding the "SSL resident needed set" is the same as discussed above for finding the "K resident needed set") is found to contain the following components: C12 and C13. The "SSL non-resident needed set" (the method for finding the "SSL non-resident needed set" is the same as discussed above for finding the "K non-resident needed set") is found to contain no components. The components determined to be needed by the system shared library 353 (this includes both SSL resident needed set and SSL non-resident needed set) will be assumed to be added to the system shared library domain 353, and a new list is maintained, which may be denoted SSL', which contains the components of the "SSL access set", and the components of the "SSL resident needed set" and the "SSL non-resident needed set". This procedure of finding the "SSL present set", the "SSL access set", the "SSL resident needed set", the "SSL non-resident needed set", and SSL' is repeated for each (if any) system shared library domain in the system project. Finding SSL' for each system shared library domain 353 represents a complete list of all the components needed at that layer, via a particular domain link path (the system shared library's domain link path).

Again, moving up the hierarchy to the shared library domain 356, the present set for the shared library domain 356, denoted the "SL present set", includes the following component: C5. The "SL access set" contains the following components: C5 and SSL'. The "SL resident needed set" (the method for finding the "SL resident needed set" is the same as discussed above for finding the "K resident needed set") is found to contain the following components: C23 and C24. The "SL non-resident needed set" (the method for finding the "SL non-resident needed set" is the same as discussed above for finding the "K non-resident needed set") is found to contain no components. The components needed will be assumed to be added to the shared library domain 356, and a new list is maintained, which may be denoted SL', which contains the components of the "SL access set", the "SL resident needed set", and the "SL non-resident needed set". This procedure of finding the "SL present set", the "SL access set", the "SL resident needed set", the "SL non-resident needed set", and SL' is repeated for each shared library domain in the system project. Finding SL' for each shared library domain 356 represents a complete list of all the components needed at that layer, via a particular domain link path (the shared library's domain link path).

Moving up the hierarchy to the application domain 359a, the present set for this domain, denoted "A1 present set", includes the following components: C6, and C7. The "A1 access set" contains the following components: C6, C7, and SL'. The "A1 resident needed set" (the method for finding the "A1 resident needed set" is the same as discussed above for finding the "K resident needed set") is found to contain the following component: C25. The "A1 non-resident needed set" (the method for finding the "A1 non-resident needed set" is the same as discussed above for finding the "K non-resident needed set") is found to contain the following component: C51. The components needed will be assumed to be added to the application domain 359a, and a new list is maintained, which may be denoted A1', which contains the components of the "A1 access set", the "A1 resident needed set", and the "A1 non-resident needed set".

For the application domain 359b, the present set for this domain includes the following component: C9. The "A2 access set" contains the following components: C9, and K'. K' is in the "A2 access set" because for this application domain 359b, the domain link path connects directly to the kernel domain 350, rather than to the shared library domain 356 or the system shared library domain 353, as is the connection for the application domain 359a (as a result, the application domain 359b does not have access to the components in the shared library domain 356 or the system shared library domain 353). The "A2 resident needed set" (the method for finding the "A2 resident needed set" is the same as discussed above for finding the "K resident needed set") is found to contain the following component: C26. The "A2 non-resident needed set" (the method for finding the "A2 non-resident needed set" is the same as discussed above for finding the "K non-resident needed set") is found to contain no components. The components needed will be assumed to be added to the application domain 359b, and a new list is maintained, which may be denoted A2', which contains the components of the "A2 access set", the "A2 resident needed set", and the "A2 non-resident needed set". The addition of these three sets represents a complete list of all the components needed at that layer, via a particular domain link path.

Throughout the above analysis of each of the domains of a particular system project, not only is the resident needed set, and the non-resident needed set of each domain tracked, but also to which domains those components in the sets belong.

The second pass of the scale-up phase puts each of the set of components that are needed but cannot reside in the particular domain that needs it (i.e., the components in the non-resident needed set) into a domain (i.e., a domain at a lower level along its domain link path) that can accept the particular component. As stated earlier, the user of the configuration tool 553 may specify whether a particular component can reside in a particular domain.

In the second pass, the resident needed set of a domain is first analyzed to determine if this set needs more components. If the resident needed set needs more components, then those newly discovered needed components are added to that particular domain's resident needed set or the non-resident needed set depending on whether the newly discovered component can reside in that particular domain. Then, a domain link path is traversed to find a domain at a lower level in which each of the components in the non-resident needed set can reside. Once the project analysis utility 550 finds a domain that will accept a particular component, that particular component is added to that domain's resident needed set.

Figure 13A:
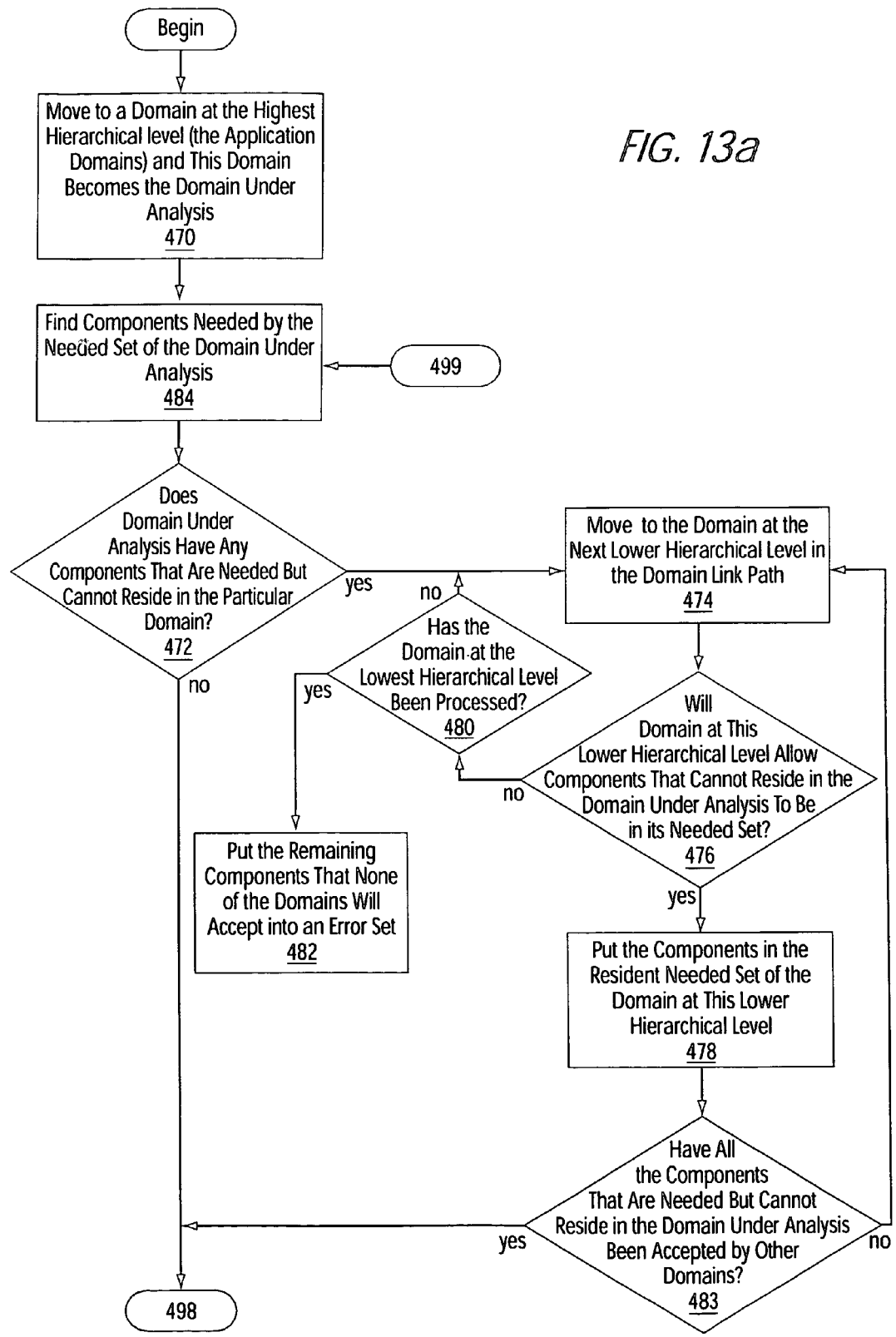
FIGS. 13a-b show a flowchart illustrating second pass scale-up steps used in the second exemplary embodiment according to the present invention.
Figure 13B:
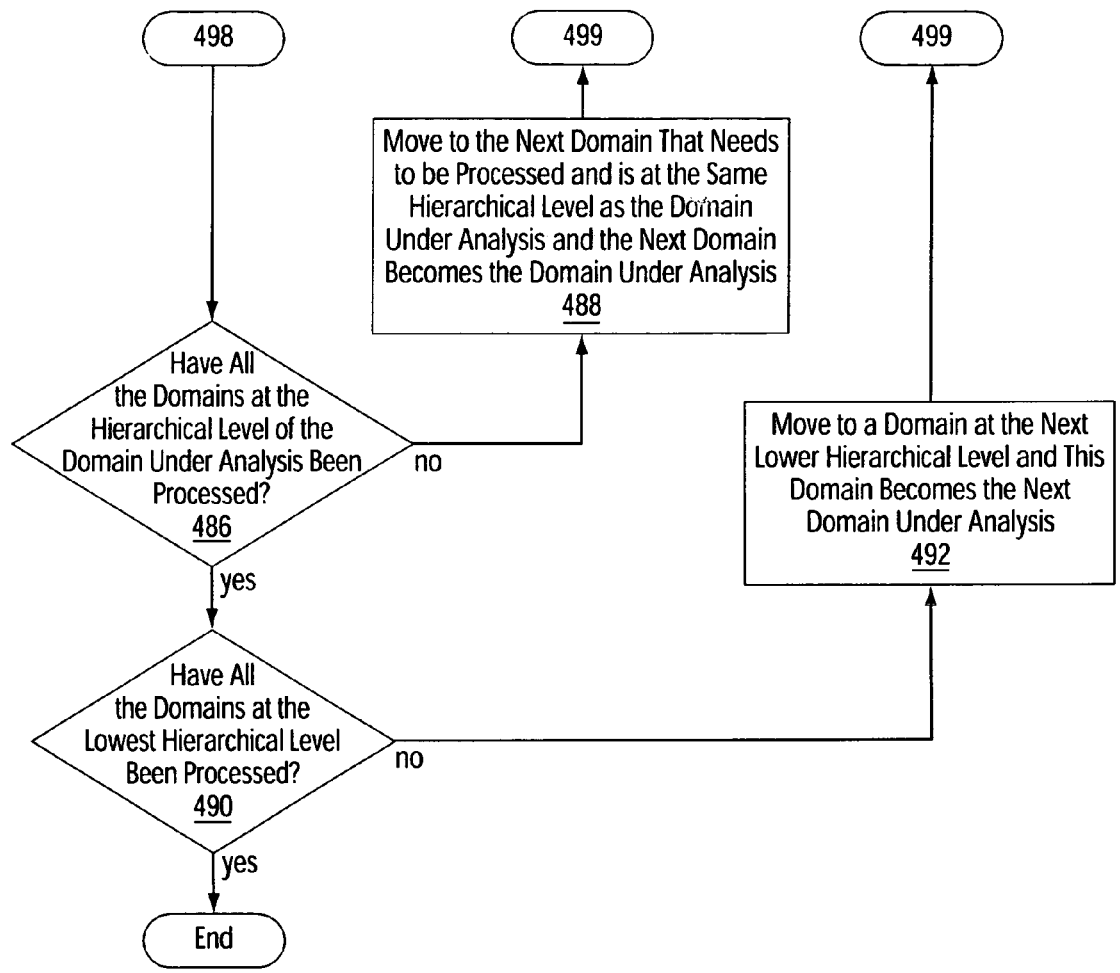

FIGS. 13a–b show a flowchart illustrating second pass scale-up steps used in the second exemplary embodiment according to the present invention. Referring to FIG. 13a, in step 470, the second pass begins with one of the domains at the highest hierarchical level (i.e., select one of the application domains). For the remainder of the description of this flowchart, the first domain selected will be referred to as the "domain under analysis". In step 484, the project analysis utility 550 finds the components needed by the resident needed set of the domain under analysis. The components needed may be inserted into either the resident needed set or the non-resident needed set depending on whether a particular component can reside in the domain that needs that component.

In step 472, the project analysis utility 550 determines if the domain under analysis has any components that are needed but cannot reside in that domain (i.e., determines if there are any components in the non-resident needed set). If there are needed components that cannot reside in the domain under analysis, then in step 474, the project analysis utility 550 analyzes the domain at the next lower hierarchical level in the domain link path. In step 476, the project analysis utility 550 determines if the domain at this lower hierarchical level will accept the components in the non-resident needed set (i.e., determine if the components can reside in this domain; whether a particular component can reside in a particular domain is specified by the user of the configuration tool 553). If the domain will accept components in the non-resident needed set, then in step 478, those components are put into the resident needed set of the domain at this lower hierarchical level. In step 483, the project analysis utility 550 determines if all the components in the non-resident needed set of the domain under analysis have been accepted by other domains. If all the components have not been accepted, then in step 474, the project analysis utility 550 analyzes the domain at the next lower hierarchical level in the domain link path of the domain under analysis.

In step 476, if the domain at this lower hierarchical level will not accept the components in the non-resident needed set, then in step 480, the project analysis utility 550 determines if the domain at the lowest hierarchical level (i.e., the kernel domain) has been processed. If the domain at the lowest hierarchical level has not been processed, then in step 474, the project analysis utility 550 analyzes the domain at the next lower hierarchical level in the domain link path. If the domain at the lowest hierarchical level has been analyzed, then in step 482, the remaining components in the non-resident needed set that none of the domains in the domain link path of the domain under analysis will accept are inserted into an error set and the user of the project facility 556 is notified. The user should add a domain in the domain link path that can accept these needed components.

In step 483, if all the components that are in the non-resident needed set have been accepted by other domains in the domain link path of the domain under analysis, then in step 486, the project analysis utility 550 determines if all the domains at the hierarchical level of the domain under analysis have been processed. If all the domains at the hierarchical level of the domain under analysis have not been processed, then in step 488, another domain at that hierarchical level that has not been processed becomes the domain under analysis. Then, the project analysis utility 550 returns to step 484 to analyze the components in the non-resident needed set of the new domain under analysis.

In step 486, if all the domains at the hierarchical level of the domain under analysis have been processed then in step 490, the project analysis utility 550 determines if all the domains at the lowest hierarchical level (i.e., the kernel domain) have been processed. If all the domains at the lowest hierarchical level have not been processed, then in step 492, the project analysis utility 550 analyzes the domain at the next lower hierarchical level and this domain becomes the domain under analysis. Then, the project analysis utility 550 returns to step 484 to analyze the components in the non-resident needed set of the new domain under analysis. If all the domains at the lowest hierarchical level have been processed, then the second pass is complete.

Figure 14:
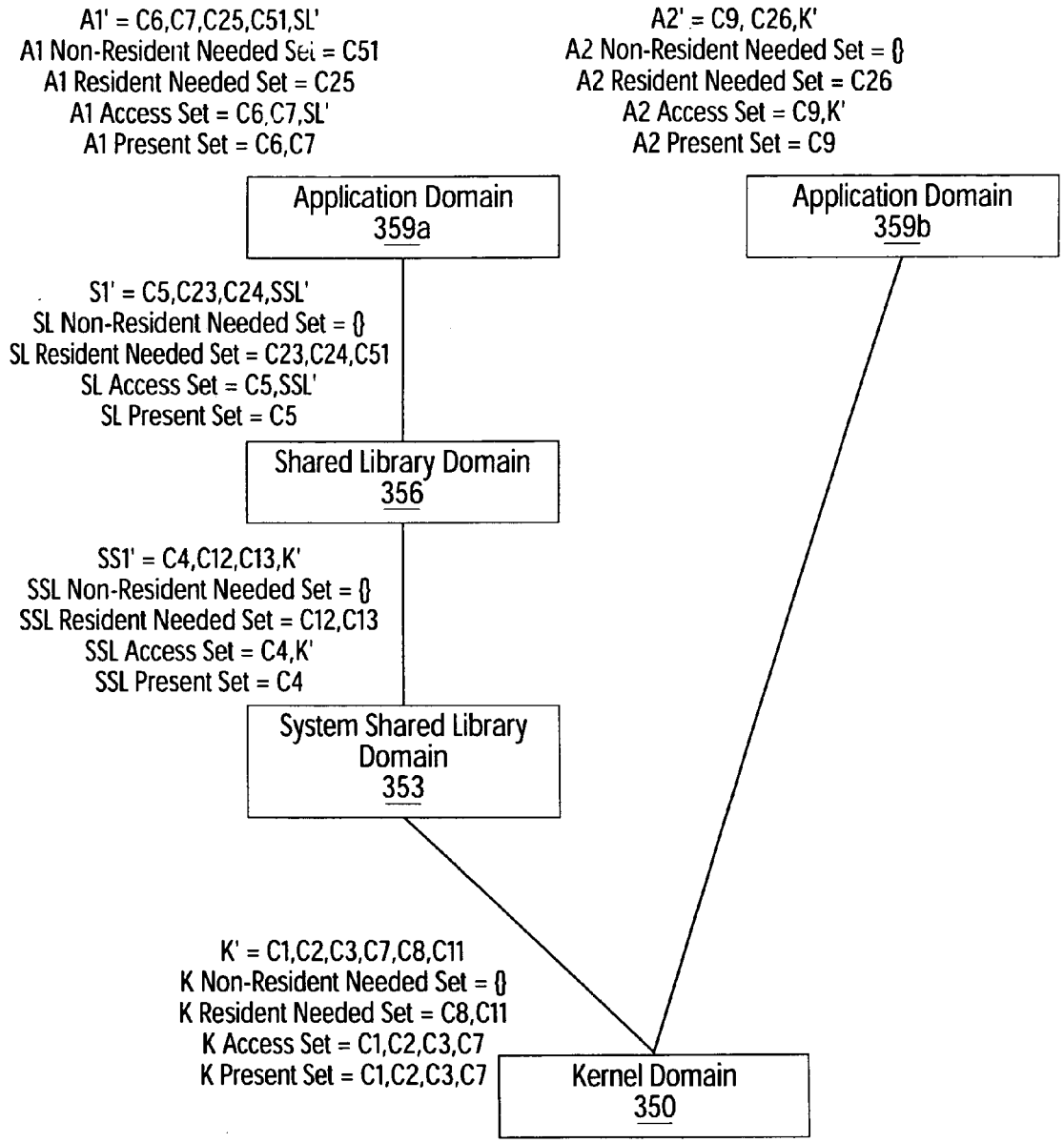
FIG. 14 shows an example of the application of the second exemplary embodiment according to the present invention to find domains acceptable to the components that are needed but cannot reside in the particular domain that needs it.

FIG. 14 shows an example of the application of the second exemplary embodiment according to the present invention to find domains acceptable to the components that are needed but cannot reside in the particular domain that needs it. The second pass of the scale-up phase begins at the highest hierarchical level (i.e., the level of the application domains). The project analysis utility 550 may start by analyzing the application domain 359a. The "A1 resident needed set" is analyzed to determine if those components need more components. If additional components are needed, then those additional components are inserted into "A1 resident needed set" or "A1 non-resident needed set" depending on whether the newly discovered components can reside in the application domain 359a. For this example, assume that the "A1 resident needed set" does not need additional components.

Next, the "A1 non-resident needed set" is analyzed. Traversing the application domain 359a's link path, if the shared library 356 will accept components, then those components are inserted into the "SL resident needed set". If the system shared library domain 353 will accept components, then those components are inserted into the "SSL resident needed set". If the kernel domain 350 will accept components, then those components are inserted into the "K resident needed set". If none of the domains in the domain link path for the application domain 359*a* accepts a component, then that component is inserted into an error set. In this example, assume that the only component in the "A1 non-resident needed set" C51 is accepted by the shared library domain and thus inserted into "SL resident needed set".

Similar steps are performed for the application domain 359*b* as for the application domain 359*a*. In this example, assume that the "A2 non-resident needed set" is empty even after analyzing the "A2 resident needed set" to find additional needed components.

Next, the project analysis utility 550 moves to the shared library domain 356. The "SL resident needed set" is analyzed (including component C51 which could not reside in the application domain 359*a*) to determine if more components are needed by this set. Newly discovered needed components are inserted either into the "SL resident needed set" or the "SL non-resident needed set". The project analysis utility 550 then queries the system shared library domain 353 and the kernel domain 350 to determine if they will accept the components in the SL non-resident needed set. If the system shared library domain 353 accept those components, then those components are inserted into the "SSL resident needed set". If the kernel domain 350 accepts those components, then those components are inserted into the "K resident needed set". In this example, assume that the "SL non-resident needed set" is empty even after analyzing the "SL resident needed set" to find additional needed components.

The project analysis utility 550 then moves to the system shared library domain 353. The "SSL resident needed set" is analyzed to determine if more components are needed by this set. Newly discovered needed components are inserted either into the "SSL resident needed set" or the "SSL non-resident needed set". The project analysis utility 550 then queries the kernel domain 350 to determine if it will accept the components in the "SSL non-resident needed set". If the kernel domain 350 accepts those components, then those components are inserted into the "K resident needed set". In this example, assume that the "SSL non-resident needed set" is empty even after analyzing the "SSL resident needed set" to find additional needed components.

Finally, the kernel domain 350 is analyzed to determine if the "K resident needed set" needs more components. The kernel domain 350 may be configured such that needed components are only inserted into the "K resident needed set" (i.e., the needed components are not inserted into the "K non-resident needed set"). The kernel domain 350 may be configured such that any components that the kernel domain 350 needs will be put into "K resident needed set" irrespective of the component's specification of it's required domain type.

After the second pass of the system project is complete, all the needed components have been identified that are required in order to have a working system project.

Figure 15:
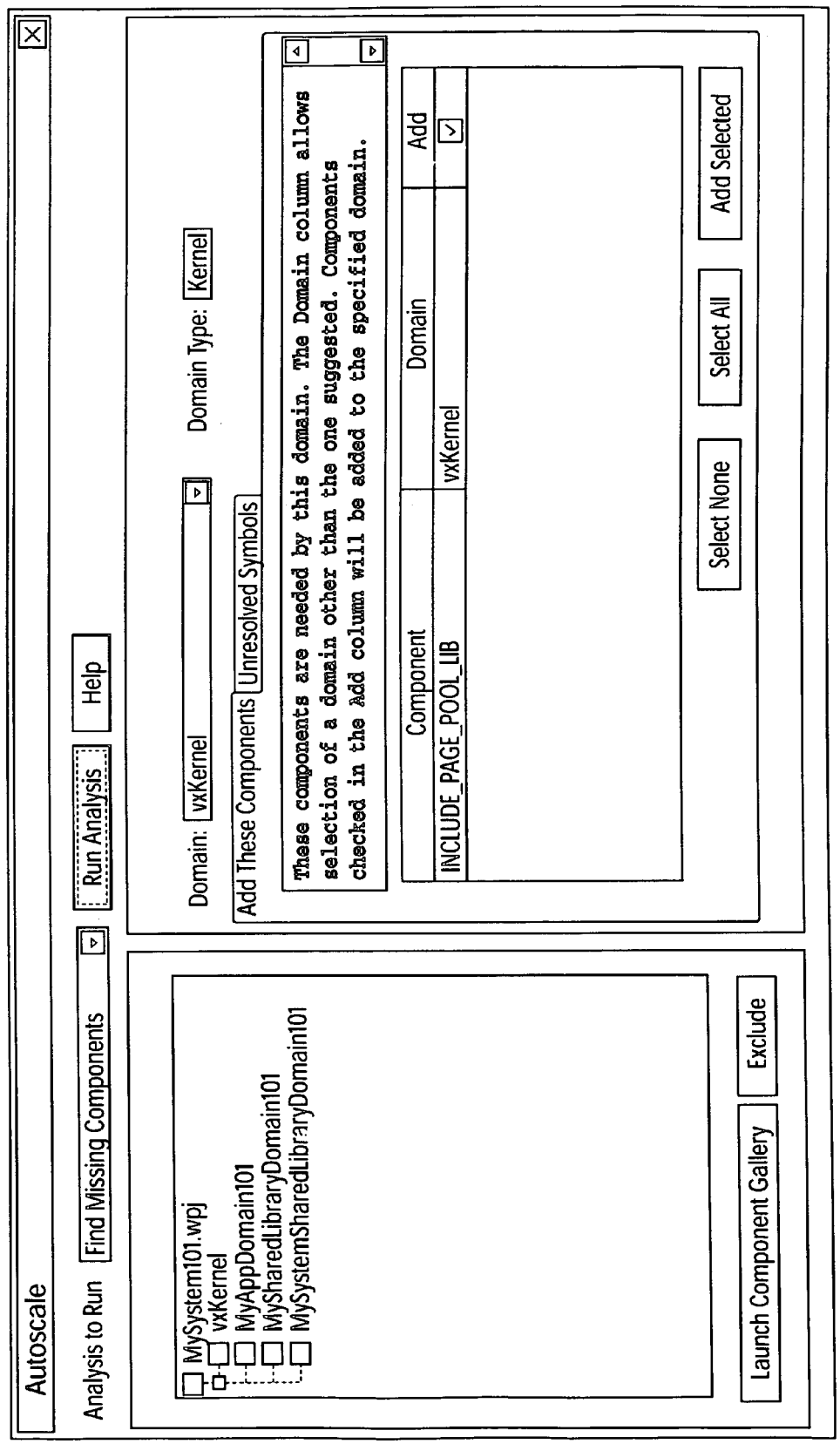
FIG. 15 shows a screen display according to the present invention that allows the user to add components that are needed to a domain in a particular system project.

Referring to FIG. 9, in step 412, the user of the project facility 556 is allowed to add needed components to a particular domain. FIG. 15 shows a screen display (provided by GUI 271) according to the present invention that allows the user to add components from the needed set (i.e., those needed components that can reside in the domain) to a domain in a particular system project. In FIG. 15, a check mark in the box corresponding to a needed component means that the needed component will be added to the present set of the particular domain. For example, in the "vxKernel" domain, the "INCLUDE_PAGE_POOL_LIB" component has a check mark in the box corresponding to that needed component and thus that needed component will be added to the present set of the "vxKernel" domain.

Referring to FIG. 9, in step 415, deadwood removal is performed in order to find the unneeded components in each domain of a working system project. In general, the goal of deadwood removal is to take two sets, the first constituting the components currently in the system project and assumed to produce a working system (designated a "present set"), and the second, the set of those components against which the user would like to perform deadwood removal (designated a "precious set") and produce the largest possible set of components that can be safely removed from the system project. A precious set for a particular domain are the set of components in that particular domain that cannot be considered deadwood components, i.e., cannot be removed. The precious set is specified by the user.

Figure 16A:
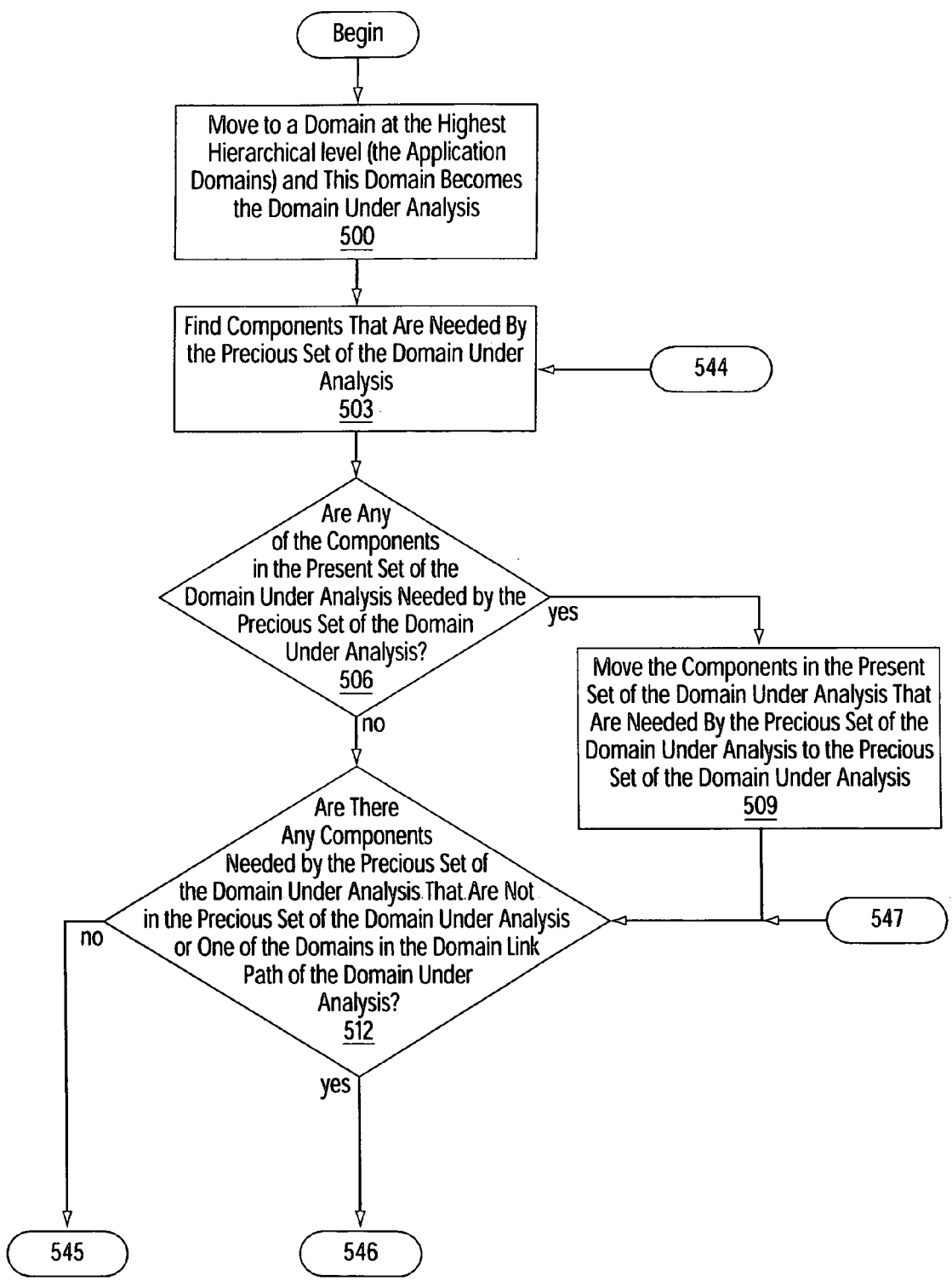
FIGS. 16a-c show a flowchart illustrating deadwood removal steps used in the second exemplary embodiment according to the present invention.
Figure 16B:
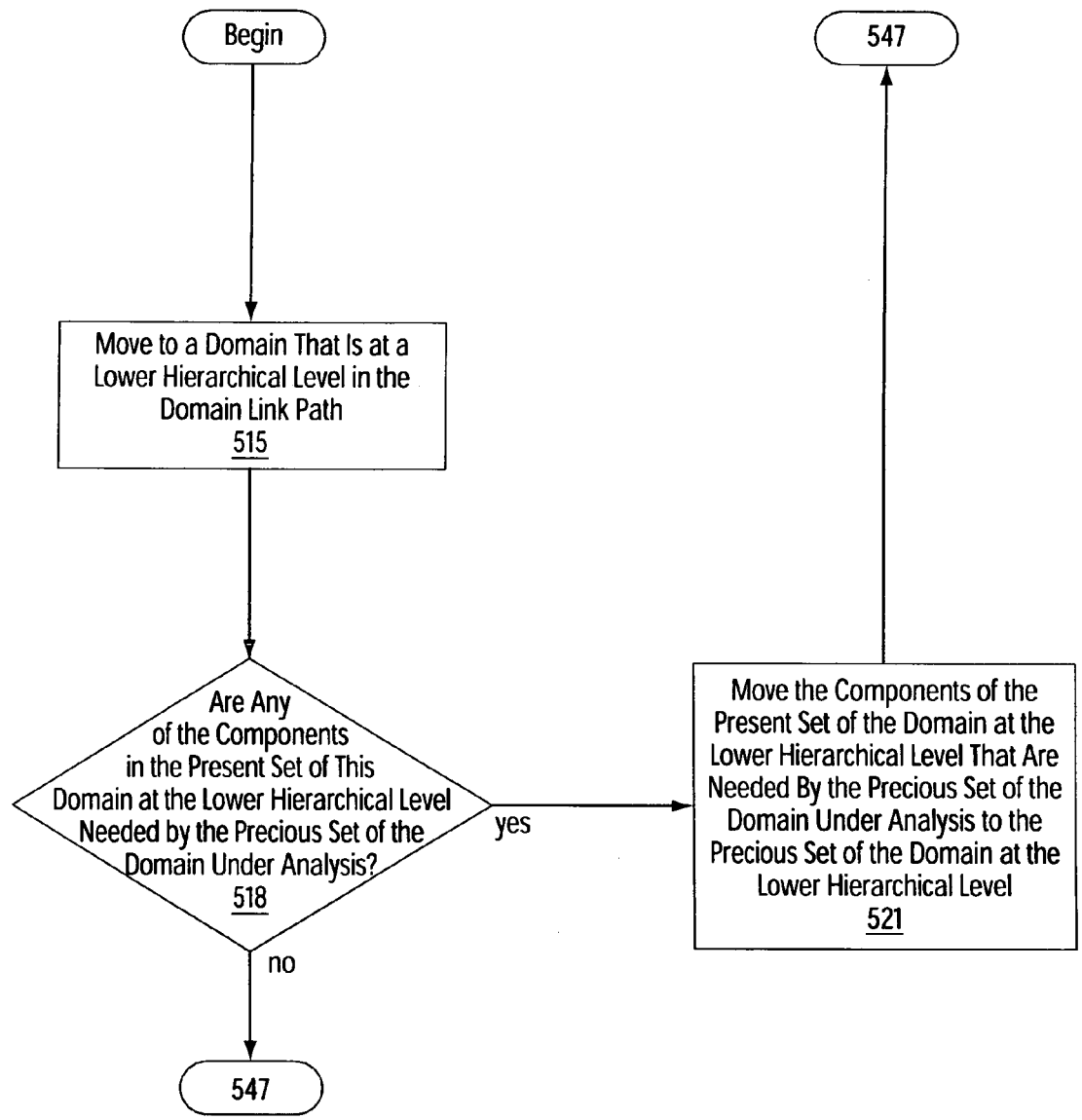
Figure 16C:
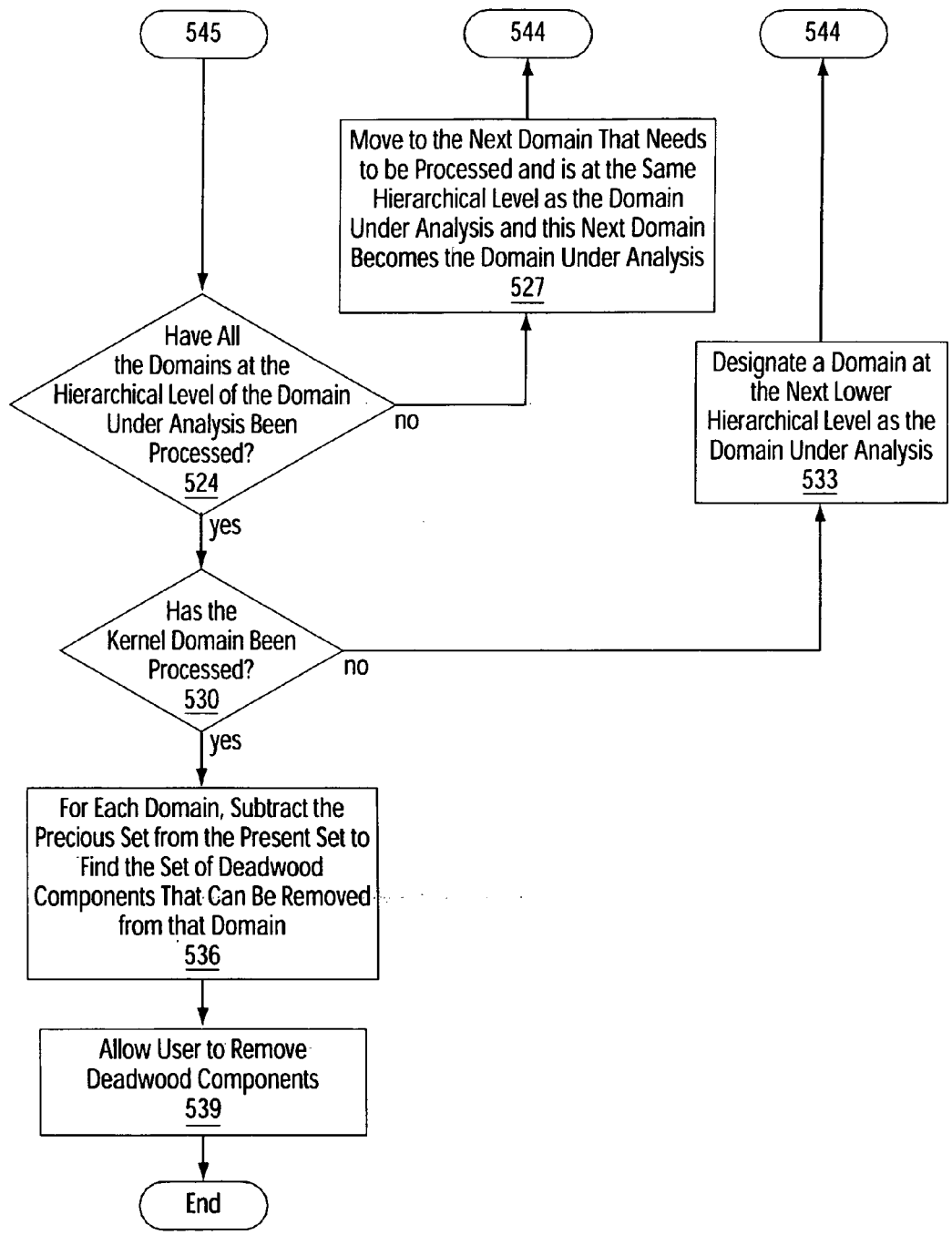

FIGS. 16*a–c* show a flowchart illustrating deadwood removal steps used in the second exemplary embodiment according to the present invention. Given a precious set and the present set (i.e., the present set may include those components that the user chooses to include in a particular domain after the scale-up phase as described earlier). Referring to FIG. 16*a*, in step 500, the deadwood analysis begins with one of the domains at the highest hierarchical level (i.e., the hierarchical level of the application domains). For the remainder of the description of this flowchart, the first domain selected will be referred to as the "domain under analysis". The domain under analysis may have a precious set and a present set.

In step 503, the project analysis utility 550 finds the components that are needed by the precious set of the domain under analysis. The needed components may be found using the mxrDoc database 259, the cxrDoc database 265, and entry points. In step 506, the project analysis utility 550 determines if any of the components in the present set of the domain under analysis is needed by the precious set of the domain under analysis. If any of the components in the present set are needed, then in step 509, the components in the present set that are needed by the components in the precious set are moved to the precious set. In step 512, the project analysis utility 550 determines if all the components needed by the precious set are in the precious set of the domain under analysis or in the precious sets of any of the domains in the domain link path of the domain under analysis. If there are components that are not in a precious set, then in step 515, the next domain analyzed is the one that is at a lower hierarchical level in the domain link path than the one previously analyzed. By traversing the domain link path of the domain under analysis, the project analysis utility 550 is ensuring that the needed components that the domain under analysis has access to is protected so that a working system project is built.

In step 518, the project analysis utility 550 checks if any of the components in the present set of this domain at the lower hierarchical level is needed by the precious set of the domain under analysis. If it is needed, then in step 521, the components that are needed by the precious set of the domain under analysis are moved from the present set to the precious set of the domain at the lower hierarchical level. The project analysis utility 550 then returns to step 512 to determine if there are more components needed by the precious set of the domain under analysis. In step 518, if none of the components in the present set of this domain at the lower hierarchical level is needed by the precious set of the domain under analysis, then the project analysis utility

550 returns to step 512 to determine if there are more components needed by the precious set of the domain under analysis.

In step 512, if all the components needed by the precious set of the domain under analysis are in the precious set of the domain under analysis or in the precious sets of any of the domains in the domain link path of the domain under analysis, then in step 524, the project analysis utility 550 determines if all the domains at the hierarchical level of the domain under analysis have been processed. If all the domains at that hierarchical level have not been processed, then in step 527, another domain at that hierarchical level that has not been processed is set to the domain under analysis. Then, the project analysis utility 550 returns to step 503 to repeat the process of putting needed components into precious sets for the new domain under analysis.

If all the domains at the hierarchical level of the domain under analysis have been processed, then in step 530, the project analysis utility 550 determines if the kernel domain has been processed. If the kernel domain has not been processed, then in step 533, the project analysis utility 550 designates a domain at the next lower hierarchical level as the domain under analysis. Then, the project analysis utility 550 returns to step 503 to repeat the process of putting needed components into precious sets for the new domain under analysis.

If the kernel domain has been processed, then in step 536, for each domain, the precious set is subtracted from the present to find a set of deadwood components that can be safely removed from the corresponding domain. In step 539, the user of the project facility 556, for each domain, is given the option to remove the deadwood components.

Figure 17:
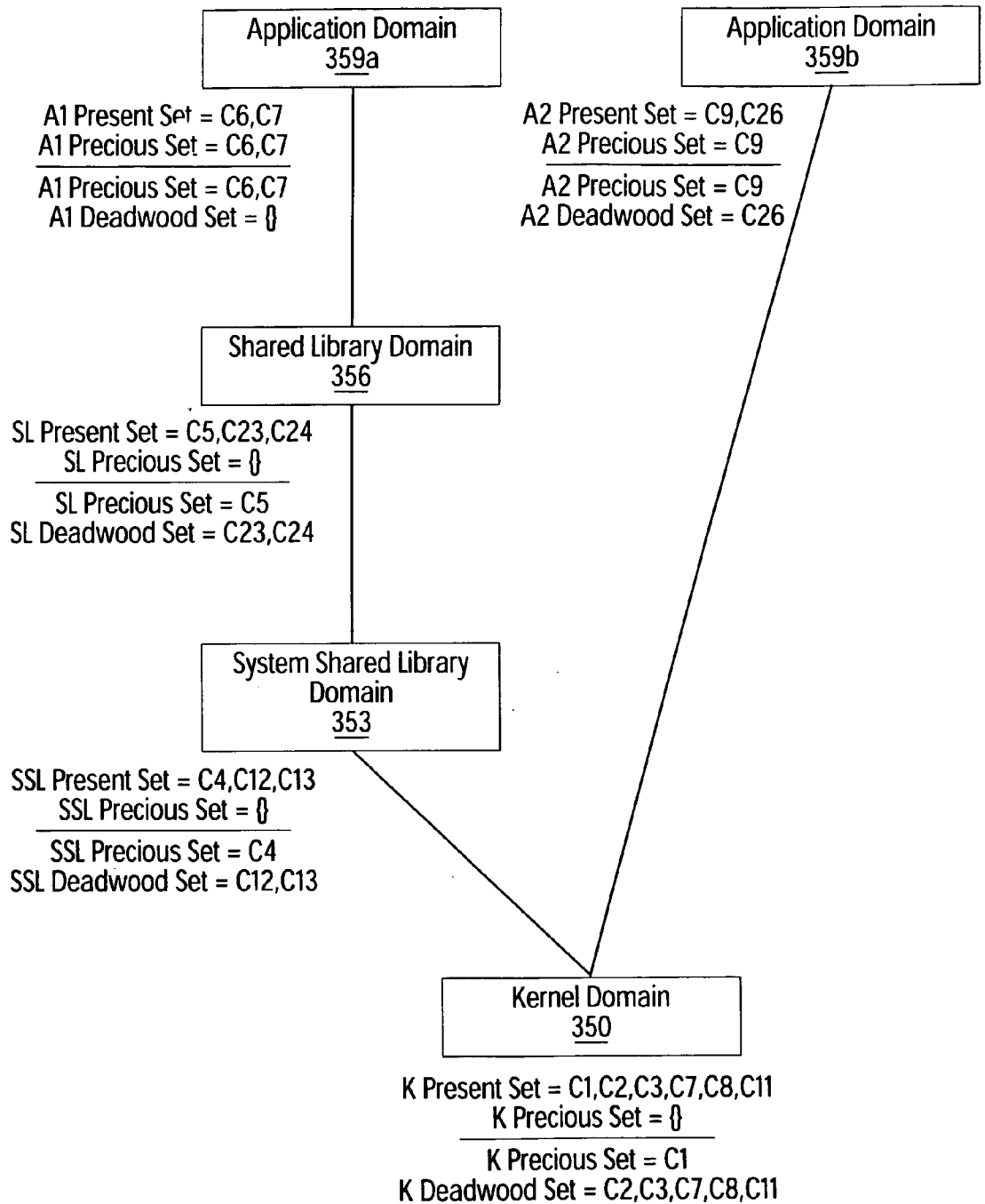
FIG. 17 shows an example of the application of the second exemplary embodiment according to the present invention to find deadwood components for each of the domains in the system project.

FIG. 17 shows an example of the application of the second exemplary embodiment according to the present invention to find deadwood components (i.e., deadwood components are extraneous components that can be safely removed) for each of the domains in the system project. In FIG. 17, the user of the project facility 556 designated the following precious sets: A1 precious set=C6, C7; A2 precious set=C9; SL precious set={}; SSL precious set={}; and K precious set={}. The deadwood removal analysis begins at the highest hierarchical level (i.e., the level of the application domains).

For the application domain 359a, the project analysis utility 550 first finds the components needed by its precious set. Here, assume that the "A1 precious set" needs the following components: C1, C4, and C5 (these needed components are found analyzing the mxrDoc database 259, the cxrDoc database 265, and the entry points). Because none of the components needed by the precious set are in the present set, the project analysis utility 550 moves to a domain that is at a lower hierarchical level along the application domain 359a's domain link path. This results in the analysis of the shared library domain 356. The shared library domain 356 has in its present set the needed component C5, and thus C5 is moved to the "SL precious set" (the new "SL precious set" is shown below the dotted line in FIG. 17).

Because C1 and C4 are not in a precious set, the project analysis utility 550 moves to a domain that is at a lower hierarchical level along the application domain 359a's domain link path. This results in the analysis of the system shared library domain 353. The system shared library domain 353 has in its present set the needed component C4 and thus C4 is moved to the "SSL precious set" (the new "SSL precious set" is shown below the dotted line in FIG. 17). Because C1 is not in a precious set, the project analysis utility 550 moves to a domain that is at a lower hierarchical level along the application domain 359a's domain link path. This results in the analysis of the kernel domain 350. The kernel domain 350 has in its present set the needed component C1, and thus C1 is moved to the "K precious set" (the new "K precious set" is shown below the dotted line in FIG. 17). Because all the needed components of the precious set are in precious sets along the application domain's link path, the analysis of the application domain 359a is complete.

Next, the project analysis utility 550 analyzes the application domain 359b. Assume that the "A2 precious set" that includes C9 does not need any other components. Therefore, the project analysis utility 550 analyzes the shared library domain 356. Assume that the "SL precious set" that includes C5 does not need any other components. Therefore, the project analysis utility 550 analyzes the system shared library domain 353. Assume that the "SSL precious set" that includes C4 does not need any other components. Therefore, the project analysis utility 550 analyzes the kernel domain 350. Assume that the "K precious set" does not need any other components.

Because the project analysis utility 550 analyzed the kernel domain (signifying that it analyzed all the domains in the system project), the project analysis utility 550, then finds the deadwood components. For each domain, a deadwood set is found by subtracting the precious set from the present set. The components in the deadwood set can be safely removed from the present set of the particular domain. In FIG. 17, the deadwood sets (shown below the dotted line) have the following values: "A1 deadwood set"={}, "A2 deadwood set"=C26, "SL deadwood set"=C23, C24, "SSL deadwood set"=C12, C13, and "K deadwood set"=C2, C7, C8, C11. The deadwood sets in each domain are presented to the user for removal at the user's discretion.

Figure 18:
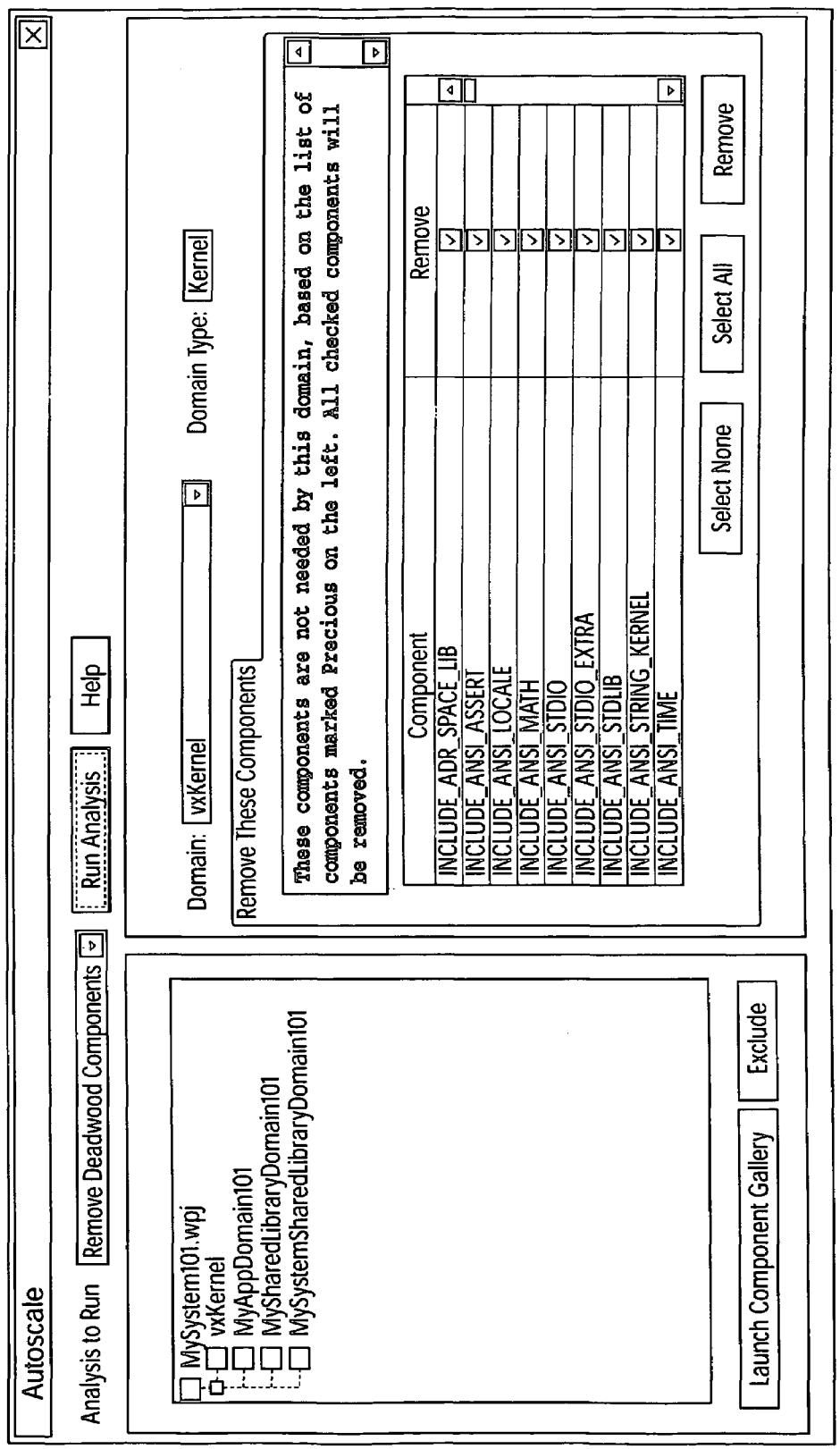
FIG. 18 shows a screen display according to the present invention that allows the user to remove deadwood components from a domain in a particular system project.

FIG. 18 shows a display (provided by GUI 271) according to the present invention that allows the user to remove deadwood components from a domain in a particular system project. The window displays the deadwood components and the domains in which they reside for a particular system project. For example, in FIG. 18, for the vxKernel domain, the deadwood components slated for removal are, among others, "INCLUDE_ADR_SPACE_LIB", "INCLUDE_ANSI_ASSERT", etc. The user of the project facility 556 selects a particular deadwood component for removal by placing a check mark in the box corresponding to the deadwood component.

In the preceding specification, the present invention has been described with reference to specific exemplary embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. A system, comprising a processor and a memory, the memory storing a set of instructions executable by the processor to:
   (1) determine a set of present components assigned to a domain, each of the set of present components includes a set of modules wherein the domain is part of a hierarchical set of domains connected by a domain link path;
   (2) determine a set of symbols imported by the set of modules assigned to the domain, wherein each symbol identifies a memory location storing one of a code and a data structure;

(3) determine zero or more needed components to which the domain does not have access and at least one of provides the set of symbols imported by the set of modules, and specified as required by the set of present components; and (4) add the zero or more needed components into one of the domain and the hierarchical domains.

2. The system of claim 1, wherein determining the zero or more needed components includes determining zero or more non-resident needed components which are the zero or more needed components that cannot reside in the domain, as specified by a user of a configuration tool, and determining zero or more resident needed components which are the zero or more needed components that can reside in the domain, as specified by the user.

3. The system of claim 1, wherein the domain has access only to the set of present components assigned to the domain.

4. The system of claim 2, wherein adding the zero or more needed components into the domain includes displaying the zero or more resident needed components to a user of a project facility and allowing the user to add the zero or more needed components into the domain.

5. The system of claim 2, further comprising displaying the zero or more non-resident needed components to a user of a project facility.

6. The method system of claim 1, wherein a kernel domain is at the a lowest hierarchical level of the domain link path and application domains are at a highest hierarchical level of the domain link path.

7. The system of claim 6, wherein the particular one of the set of domains does not have access to a set of components not assigned to the particular one of the set of domains, and that provides the set of symbols imported by the set of modules but the particular one of the set of domains is not given entry points to those symbols by the set of domains at lower hierarchical levels in the domain link path, and that are not in at least one of the zero or more resident needed components, and the zero or more non-resident needed components of any one of the set of domains at lower hierarchical levels in the domain link path, if such levels exist.

8. The method system of claim 7, wherein for each of the set of domains in the domain link path, starting at the lowest hierarchical level of the domain link path and traversing to the highest hierarchical level, performing steps (1) to (3) of claim 1 for each of the set of domains.

9. The system of claim 8, further comprising, for each of the set of domains in the domain link path and starting at the highest hierarchical level of that domain link path and traversing to the lowest hierarchical level,
determining the set of symbols imported by the zero or more resident needed components of that domain and determining zero or more second pass needed components that at least one of provides the set of symbols imported by the zero or more resident needed components and to which this domain does not have access, and specified by the component description file as required by the zero or more resident needed components;
inserting the zero or more second pass needed components that can reside in this domain into the zero or more resident needed components for that domain, and for each of the zero or more second pass needed components that cannot reside in this domain, traversing down the domain link path to the lowest hierarchical level until the particular one of the zero or more second pass needed components can reside in a particular one of the set of domains in the domain link path and then inserting the particular one of the zero or more second pass needed components into the particular one of the set of domains, otherwise, if the particular one of the zero or more second pass needed components cannot reside in any of the domains of the domain link path, then inserting the particular one of the zero or more second pass needed components into zero or more error components.

10. The system of claim 9, wherein adding the zero or more needed components includes displaying the zero or more resident needed components of a particular one of the set of domains to a user of a project facility and allowing the user to add the zero or more resident needed components into that domain.

11. The system of claim 9, further comprising, displaying the zero or more non-resident needed components of a particular one of the set of domains to a user of a project facility.

12. The system of claim 1, wherein the domain is an operation system protection domain.

13. The system of claim 1, further comprising:
creating a bootable application including the domain.

14. The system of claim 13, further comprising:
loading the bootable application on a target processor.

15. The system of claim 1, wherein the set of symbols includes an entry point for a second domain.

16. The system of claim 15, wherein the second domain provides access to a resource not directly accessible by the domain.

17. A system implemented by executing a set of instructions on a processor, comprising:
a first parser that lists a set of symbols and a set of modules that imports or exports the set of symbols;
a second parser that maps the set of modules to a set of components and specifies dependencies among the set of components; and
a project analysis utility that
(1) determines a set of present components assigned to a domain, each of the set of present components includes a subset of the set of modules wherein the domain is part of a hierarchical set of domains connected by a domain link path;
(2) determines a subset of the set of symbols imported by the subset of modules assigned to the domain, wherein each symbol identifies a memory location storing one of a code and a data structure;
(3) determines zero or more needed components to which the domain does not have access and at least one of provides the subset of symbols imported by the subset of modules, and specified in the mapping by the second parser as required by the set of present components; and
(4) adds the zero or more needed components into one of the domain and the hierarchical domains.

18. The system of claim 17, further comprising a configuration tool, coupled to the project analysis utility, at least one of creates the domain, assigns the set of present components to the domain, and specifies whether a particular one of the set of components may reside in the domain.

19. The system of claim 17, wherein the project analysis utility determines zero or more non-resident needed components which are the zero or more needed components that cannot reside in the domain, as specified by a user of the configuration tool, and determines zero or more resident, needed components which are the zero or more needed components that can reside in the domain, as specified by the user.

20. The system of claim 19, wherein the domain has access only to the set of present components assigned to the domain.

21. The system of claim 19, wherein the project analysis utility displays the zero or more resident needed components to a user of a project facility using a graphics user interface and allows the user to add the zero or more needed components into the domain.

22. The system of claim 19, wherein the project analysis utility displays the zero or more non-resident needed components to a user of a project facility using a graphics user interface.

23. The system of claim 17, wherein a kernel domain is at a lowest hierarchical level of the domain link path and application domains are at a highest hierarchical level of the domain link path.

24. The system of claim 23, wherein the particular one of the set of domains does not have access to a set of components not assigned to the particular one of the set of domains, and that provides the set of symbols imported by the set of modules but the particular one of the set of domains is not given entry points to those symbols by the set of domains at lower hierarchical levels in the domain link path, and that are not in at least one of the zero or more resident needed components, and the zero or more non-resident needed components of any one of the set of domains at lower hierarchical levels in the domain link path, if such levels exist.

25. The system of claim 24, wherein the project analysis utility, for each of the set of domains in the domain link path, starting at the lowest hierarchical level of the domain link path and traversing to the highest hierarchical level, performs (1) to (3) of claim 13 for each of the set of domains.

26. The system of claim 25, wherein the project analysis utility, for each of the set of domains in the domain link path and starting at the highest hierarchical level of that domain link path and traversing to the lowest hierarchical level,
  determines the set of symbols imported by the zero or more resident needed components of that domain and determines zero or more second pass needed components that at least one of provides the set of symbols imported by the zero or more resident needed components and to which this domain does not have access, and specified in the mapping by the second parser as required by the zero or more resident needed components;
  inserts the zero or more second pass needed components that can reside in this domain into the zero or more resident needed components for that domain; and
  for each of the zero or more second pass needed components that cannot reside in this domain, traverses down the domain link path to the lowest hierarchical level until the particular one of the zero or more second pass needed components can reside in a particular one of the set of domains in the domain link path and then inserts the particular one of the zero or more second pass needed components into the particular one of the set of domains, otherwise, if the particular one of the zero or more second pass needed components cannot reside in any of the domains of the domain link path, then inserts the particular one of the zero or more second pass needed components into zero or more error components.

27. The system of claim 26, wherein the project analysis utility, displays the zero or more resident needed components of a particular one of the set of domains to a user of a project facility using a graphics user interface and allows the user to add the zero or more resident needed components into that domain.

28. The system of claim 26, wherein the project analysis utility displays the zero or more non-resident needed components of a particular one of the set of domains to a user of a project facility using a graphics user interface.

29. The system of claim 17, wherein the domain is an operating system protection domain.

30. The system of claim 17, further comprising:
  a bootable application including the domain and all the need components.

31. The system of claim 17, wherein the set of symbols imported by the subset of modules assigned to the domain includes an entry point to a second domain.

32. The system of claim 31, wherein the second domain provides access to a resource not directly accessible by the domain.

33. A system comprising a processor and a memory, the memory storing a set of instructions executable by the processor to:
  (1) determine a set of present components assigned to a domain;
  (2) determine zero or more precious components specified by a user of a configuration tool as not removable from the domain, each of the zero or more precious components includes a set of modules;
  (3) determine a set of symbols imported by the set of modules in each of the zero or more precious components, wherein each symbol identifies a memory location storing one of a code and a data structure;
  (4) determine zero or more needed components to which the domain does not have access and at least one of provides the set of symbols imported by the set of modules, and specified as required by the zero or more precious components;
  (5) if one or more of the zero or more needed components is found in the set of present components, then moving move the one or more of the set of present components into the zero or more precious components; and
  (6) removing remove the set of present components from the domain.

34. The system of claim 33, wherein the domain has access only to the set of present components assigned to the domain.

35. The system of claim 34, wherein removing the set of present components from the domain includes displaying the set of present components to a user of a project facility and allowing the user to remove the set of present components from the domain.

36. The system of claim 33, wherein the domain is part of a set of domains and a domain link path connects the set of domains between a highest hierarchical level of the domain link path and a lowest hierarchical level.

37. The system of claim 38, wherein a kernel domain is at the lowest hierarchical level of the domain link path and application domains are at the highest hierarchical level of the domain link path.

38. The system of claim 37, wherein the particular one of the set of domains does not have access to a set of components not assigned to the particular one of the set of domains, and that provides the set of symbols imported by the set of modules but the particular one of the set of domains is not given entry points to those symbols by the set of domains at lower hierarchical levels in the domain link path.

39. The system of claim 38, wherein for each of the set of domains in the domain link path, starting at the highest hierarchical level of the domain link path and traversing to the lowest hierarchical level, performing steps (1) to (5) of claim 28 for each of the set of domains.

40. The system of claim 39, wherein moving the one or more of the set of present components into the zero or more precious components includes, for each of the zero or more needed components of a particular one of the set of domains in the domain link path, starting with that domain and traversing down the domain link path toward the lowest hierarchical level until the particular one of the zero or more needed components is equal to a particular one of the set of present components of one of the set of domains in the domain link path and then moving the particular one of the set of present components to the zero or more precious components of the particular one of the set of domains.

41. The system of claim 40, wherein removing the set of present components from the domain includes displaying the set of present components of a particular one of the set of domains to a user of a project facility, and allowing the user to remove one or more of the set of present components.

42. A system implemented by executing a set of instructions on a processor, comprising:
- a first parser that lists a set of symbols and a set of modules that imports or exports the set of symbols;
- a second parser that maps the set of modules to a set of components and specifies dependencies among the set of components; and
- a project analysis utility that
  (1) determines a set of present components assigned to a domain;
  (2) determines zero or more precious components specified by a user of a configuration tool as not removable from the domain, each of the zero or more precious components includes a subset of the set of modules;
  (3) determines a subset of the set of symbols imported by the subset of modules, wherein each symbol identifies a memory location storing one of a code and a data structure;
  (4) determines zero or more needed components to which the domain does not have access and at least one of provides the subset of symbols imported by the subset of modules, and specified as required by the zero or more precious components;
  (5) if one or more of the zero or more needed components is found in the set of present components, then moves the one or more of the set of present components into the zero or more precious components; and
  (6) removes the set of present components from the domain.

43. The system of claim 42, wherein the configuration tool, coupled to the project analysis utility, at least one of creates the domain, assigns the set of present components to the domain, and designates the zero or more precious components in the domain.

44. The system of claim 42, wherein the domain has access only to the set of present components assigned to the domain.

45. The system of claim 44, wherein the project analysis utility displays the set of present components to a user of a project facility using a graphics user interface and allows the user to remove the set of present components from the domain.

46. The system of claim 45, wherein the domain is part of a set of domains and a domain link path connects the set of domains between a highest hierarchical level of the domain link path and a lowest hierarchical level.

47. The system of claim 46, wherein a kernel domain is at the lowest hierarchical level of the domain link path and application domains are at the highest hierarchical level of the domain link path.

48. The system of claim 47, wherein the particular one of the set of domains does not have access to a set of components not assigned to the particular one of the set of domains, and that provides the set of symbols imported by the set of modules but the particular one of the set of domains is not given entry points to those symbols by the set of domains at lower hierarchical levels in the domain link path.

49. The system of claim 48, wherein the project analysis utility, for each of the set of domains in the domain link path, starting at the highest hierarchical level of the domain link path and traversing to the lowest hierarchical level, performing (1) to (5) of claim 37 for each of the set of domains.

50. The system of claim 49, wherein the project analysis utility, in order to move the one or more of the set of present components into the zero or more precious components, for each of the zero or more needed components of a particular one of the set of domains in the domain link path, starting with that domain and traversing down the domain link path to the lowest hierarchical level until the particular one of the zero or more needed components is equal to a particular one of the set of present components of one of the set of domains in the domain link path and then move the particular one of the set of present components to the zero or more precious components of the particular one of the set of domains.

51. The system of claim 50, wherein the project analysis utility removes the set of present components by displaying the set of present components of a particular one of the set of domains to a user of a project facility using a graphics user interface, and by allowing the user to remove one or more of the set of present components.

52. A device comprising:
- a medium; and
- a set of instructions recorded on the medium; wherein the set of instructions, when executed by a processor, cause the processor to:
  (1) determine a set of present components assigned to a domain, each of the set of present components includes a set of modules wherein the domain is part of a hierarchical set of domains connected by a domain link path;
  (2) determine a set of symbols imported by the set of modules assigned to the domain, wherein each symbol identifies a memory location storing one of a code and a data structure;
  (3) determine zero or more needed components to which the domain does not have access and at least one of provides the set of symbols imported by the set of modules, and specified as required by the set of present components; and
  (4) add the zero or more needed components into one of the domain and the hierarchical domains.

53. A device comprising:
a medium; and a set of instructions recorded on the medium; wherein the set of instructions, when executed by a processor, cause the processor to:

(1) determine a set of present components assigned to a domain;

(2) determine zero or more precious components specified by a user of a project facility as not removable from the domain, each of the zero or more precious components includes a set of modules;

(3) determine a set of symbols imported by the set of modules in each of the zero or more precious components, wherein each symbol identifies a memory location storing one of a code and a data structure;

(4) determine zero or more needed components to which the domain does not have access and at least one of provides the set of symbols imported by the set of modules, and specified as required by the zero or more precious components;

(5) if one or more of the zero or more needed components is found in the set of present components, then move the one or more of the set of present components into the zero or more precious components; and (6) remove the set of present components from the domain.

* * * * *

UNITED STATES PATENT AND TRADEMARK OFFICE
CERTIFICATE OF CORRECTION

| | |
|---|---|
| PATENT NO. | : 7,032,219 B2 |
| APPLICATION NO. | : 09/765778 |
| DATED | : April 18, 2006 |
| INVENTOR(S) | : Anthony A. Mowers et al. |

It is certified that error appears in the above-identified patent and that said Letters Patent is hereby corrected as shown below:

Column 21, line 27:

"The method system of claim" should be --The system of claim--

Column 21, line 28:

"domain is at the a lowest" should be --domain is at a lowest--

Column 21, line 43:

"The method system of claim" should be --The system of claim--

Column 23, line 36:

"of claim 13 for each" should be --of claim 17 for each--

Column 24, line 41-42\:

"components, then moving move the one" should be --components, then move the one--

UNITED STATES PATENT AND TRADEMARK OFFICE
CERTIFICATE OF CORRECTION

PATENT NO. : 7,032,219 B2
APPLICATION NO. : 09/765778
DATED : April 18, 2006
INVENTOR(S) : Anthony A. Mowers et al.

It is certified that error appears in the above-identified patent and that said Letters Patent is hereby corrected as shown below:

Column 24, line 44:

"removing remove the set" should be --remove the set--

Column 24, line 58:

"system of claim 38, wherein" should be --system of claim 36, wherein--

Column 25, line 7:

"claim 28 for each" should be --claim 35 for each--

Column 26, line 25:

"of claim 37 for each" should be --of claim 44 for each--

Signed and Sealed this

Nineteenth Day of September, 2006

JON W. DUDAS
*Director of the United States Patent and Trademark Office*